US009292873B1

(12) United States Patent
Ryan

(10) Patent No.: US 9,292,873 B1
(45) Date of Patent: Mar. 22, 2016

(54) EXPEDITED ACQUISITION OF A DIGITAL ITEM FOLLOWING A SAMPLE PRESENTATION OF THE ITEM

(71) Applicant: Amazon Technologies, Inc., Reno, NV (US)

(72) Inventor: Thomas A. Ryan, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 2 days.

(21) Appl. No.: 14/216,596

(22) Filed: Mar. 17, 2014

Related U.S. Application Data

(63) Continuation of application No. 11/537,484, filed on Sep. 29, 2006, now Pat. No. 8,725,565.

(51) Int. Cl.
*G06Q 30/00* (2012.01)
*G06Q 30/06* (2012.01)

(52) U.S. Cl.
CPC ........ *G06Q 30/0633* (2013.01); *G06Q 30/0631* (2013.01)

(58) Field of Classification Search
CPC .............. G06Q 30/0633; G06Q 30/0631
See application file for complete search history.

(56) References Cited

U.S. PATENT DOCUMENTS

| 2,684,955 | A | 9/1954 | Knowles |
| 4,622,627 | A | 11/1986 | Rodriguez et al. |
| 4,985,697 | A | 1/1991 | Boulton |
| 5,418,549 | A | 5/1995 | Anderson et al. |
| 5,495,268 | A | 2/1996 | Pearson et al. |
| 5,499,359 | A | 3/1996 | Vijaykumar |
| 5,517,407 | A | 5/1996 | Weiner |
| 5,544,305 | A | 8/1996 | Ohmaye et al. |
| 5,566,098 | A | 10/1996 | Lucente et al. |
| 5,600,775 | A | 2/1997 | King et al. |
| 5,623,260 | A | 4/1997 | Jones |
| 5,630,159 | A | 5/1997 | Zancho |
| 5,640,553 | A | 6/1997 | Schultz |
| 5,659,742 | A | 8/1997 | Beattie et al. |
| 5,661,635 | A | 8/1997 | Huffman et al. |
| 5,663,748 | A | 9/1997 | Huffman et al. |
| 5,696,982 | A | 12/1997 | Tanigawa et al. |
| 5,710,922 | A | 1/1998 | Alley et al. |

(Continued)

FOREIGN PATENT DOCUMENTS

| CN | 1362682 | | 8/2002 |
| CN | 1841373 | A | 10/2006 |

(Continued)

OTHER PUBLICATIONS

The Canadian Office Action mailed Dec. 15, 2014 for Canadian patent application No. 2681754, a counterpart foreign application of U.S. Appl. No. 11/763,369, 5 pages.

(Continued)

*Primary Examiner* — Calvin Cheung
(74) *Attorney, Agent, or Firm* — Lee & Hayes, PLLC

(57) ABSTRACT

An electronic service provides a sample of a media item to a user, along with a prompt. The prompt gives the user the opportunity to receive an additional part of the item substantially without further interaction with the user. The streamlined acquisition of the additional part of the media item is enabled by the user's establishment, in advance, of user identification information, payment information, and so on.

20 Claims, 15 Drawing Sheets

(56) References Cited

U.S. PATENT DOCUMENTS

| | | |
|---|---|---|
| 5,711,922 A | 1/1998 | O'Brien et al. |
| 5,742,905 A | 4/1998 | Pepe et al. |
| 5,761,485 A | 6/1998 | Munyan |
| 5,765,168 A | 6/1998 | Burrows |
| 5,774,109 A | 6/1998 | Winksy et al. |
| 5,813,017 A | 9/1998 | Morris |
| 5,845,278 A | 12/1998 | Kirsch et al. |
| 5,845,301 A | 12/1998 | Rivette et al. |
| 5,847,698 A | 12/1998 | Reavey et al. |
| 5,892,900 A | 4/1999 | Ginter et al. |
| 5,923,861 A | 7/1999 | Bertram et al. |
| 5,930,026 A | 7/1999 | Jacobson et al. |
| 5,940,846 A | 8/1999 | Akiyama |
| 5,956,048 A | 9/1999 | Gaston |
| 5,960,411 A | 9/1999 | Hartman et al. |
| 5,973,681 A | 10/1999 | Tanigawa et al. |
| 5,991,439 A | 11/1999 | Tanaka et al. |
| 6,018,575 A | 1/2000 | Gross et al. |
| 6,034,839 A | 3/2000 | Hamming |
| 6,037,954 A | 3/2000 | McMahon |
| 6,041,335 A | 3/2000 | Merritt et al. |
| 6,047,189 A | 4/2000 | Yun et al. |
| 6,049,334 A | 4/2000 | Bates et al. |
| 6,049,796 A | 4/2000 | Siitonen et al. |
| 6,064,980 A | 5/2000 | Jacobi et al. |
| 6,073,148 A | 6/2000 | Rowe et al. |
| 6,113,394 A | 9/2000 | Edgar |
| 6,148,340 A | 11/2000 | Bittinger et al. |
| 6,154,757 A | 11/2000 | Krause et al. |
| 6,164,974 A | 12/2000 | Carlile et al. |
| 6,195,698 B1 | 2/2001 | Lillibridge et al. |
| 6,201,771 B1 | 3/2001 | Otsuka et al. |
| 6,209,007 B1 | 3/2001 | Kelley et al. |
| 6,226,642 B1 | 5/2001 | Beranek et al. |
| 6,233,318 B1 | 5/2001 | Picard et al. |
| 6,272,461 B1 | 8/2001 | Meredith et al. |
| 6,300,947 B1 | 10/2001 | Kanevsky |
| 6,308,320 B1 | 10/2001 | Burch |
| 6,313,828 B1 | 11/2001 | Chombo |
| 6,331,866 B1 | 12/2001 | Eisenberg |
| 6,331,867 B1 | 12/2001 | Eberhard et al. |
| 6,335,678 B1 | 1/2002 | Heutschi |
| 6,351,750 B1 | 2/2002 | Duga et al. |
| 6,385,596 B1 | 5/2002 | Wiser et al. |
| 6,401,086 B1 | 6/2002 | Bruckner |
| 6,401,239 B1 | 6/2002 | Miron |
| 6,442,651 B2 | 8/2002 | Crow et al. |
| 6,449,627 B1 | 9/2002 | Baer et al. |
| 6,457,030 B1 | 9/2002 | Adams et al. |
| 6,466,951 B1 | 10/2002 | Birkler et al. |
| 6,484,212 B1 | 11/2002 | Markowitz et al. |
| 6,487,669 B1 | 11/2002 | Waring |
| 6,493,734 B1 | 12/2002 | Sachs et al. |
| 6,496,803 B1 | 12/2002 | Seet et al. |
| 6,529,920 B1 | 3/2003 | Arons et al. |
| 6,535,857 B1 | 3/2003 | Clarke, III et al. |
| 6,542,874 B1 | 4/2003 | Walker et al. |
| 6,559,882 B1 | 5/2003 | Kerchner |
| 6,560,699 B1 | 5/2003 | Konkle |
| 6,574,658 B1 | 6/2003 | Gabber et al. |
| 6,629,138 B1 | 9/2003 | Lambert et al. |
| 6,631,495 B2 | 10/2003 | Kato et al. |
| 6,642,947 B2 | 11/2003 | Feierbach |
| 6,658,623 B1 | 12/2003 | Schilit et al. |
| 6,685,482 B2 | 2/2004 | Hopp et al. |
| 6,687,878 B1 | 2/2004 | Eintracht et al. |
| 6,704,733 B2 | 3/2004 | Clark et al. |
| 6,721,869 B1 | 4/2004 | Senthil |
| 6,724,403 B1 | 4/2004 | Santoro et al. |
| 6,725,227 B1 | 4/2004 | Li |
| 6,726,487 B1 | 4/2004 | Dalstrom |
| 6,735,583 B1 | 5/2004 | Bjarnestam et al. |
| 6,744,891 B1 | 6/2004 | Allen |
| 6,744,967 B2 | 6/2004 | Kaminski et al. |
| 6,801,751 B1 | 10/2004 | Wood et al. |
| 6,803,930 B1 | 10/2004 | Simonson |
| 6,804,489 B2 | 10/2004 | Stuppy et al. |
| 6,829,594 B1 | 12/2004 | Kitamura |
| 6,847,966 B1 | 1/2005 | Sommer et al. |
| 6,904,449 B1 | 6/2005 | Quinones |
| 6,912,398 B1 | 6/2005 | Domnitz |
| 6,933,928 B1 | 8/2005 | Lilienthal |
| 6,938,076 B2 | 8/2005 | Meyer et al. |
| 6,947,922 B1 | 9/2005 | Glance |
| 6,948,135 B1 | 9/2005 | Ruthfield et al. |
| 6,953,343 B2 | 10/2005 | Townshend |
| 6,966,029 B1 | 11/2005 | Ahern |
| 6,980,652 B1 | 12/2005 | Braitberg et al. |
| 6,985,932 B1 | 1/2006 | Glaser et al. |
| 6,992,687 B1 | 1/2006 | Baird et al. |
| 6,999,449 B2 | 2/2006 | Barna et al. |
| 6,999,565 B1 | 2/2006 | Delaney et al. |
| 7,007,015 B1 | 2/2006 | Nayak |
| 7,009,596 B2 | 3/2006 | Seet et al. |
| 7,010,500 B2 | 3/2006 | Aarnio |
| 7,010,751 B2 | 3/2006 | Shneiderman |
| 7,020,654 B1 | 3/2006 | Najmi |
| 7,020,663 B2 | 3/2006 | Hay et al. |
| 7,054,914 B2 | 5/2006 | Suzuki et al. |
| 7,057,591 B1 | 6/2006 | Hautanen et al. |
| 7,062,707 B1 | 6/2006 | Knauft et al. |
| 7,071,930 B2 | 7/2006 | Kondo et al. |
| 7,080,076 B1 | 7/2006 | Williamson et al. |
| 7,089,292 B1 | 8/2006 | Roderick et al. |
| 7,092,116 B2 | 8/2006 | Calaway |
| 7,103,848 B2 | 9/2006 | Barsness et al. |
| 7,107,533 B2 | 9/2006 | Duncan et al. |
| 7,111,250 B1 | 9/2006 | Hayward et al. |
| 7,130,841 B1 | 10/2006 | Goel et al. |
| 7,133,506 B1 | 11/2006 | Smith |
| 7,135,932 B2 | 11/2006 | Quadir et al. |
| 7,149,776 B1 | 12/2006 | Roy et al. |
| 7,165,217 B1 | 1/2007 | Kondo |
| 7,181,502 B2 | 2/2007 | Incertis |
| 7,188,085 B2 | 3/2007 | Pelletier |
| 7,191,346 B2 | 3/2007 | Abe et al. |
| 7,209,888 B2 | 4/2007 | Frid-Nielsen et al. |
| 7,216,116 B1 | 5/2007 | Nilsson et al. |
| 7,237,123 B2 | 6/2007 | LeVine et al. |
| 7,246,118 B2 | 7/2007 | Chastain et al. |
| 7,249,046 B1 | 7/2007 | Katsurabayashi et al. |
| 7,249,060 B2 | 7/2007 | Ling |
| 7,249,324 B2 | 7/2007 | Nakamura et al. |
| 7,257,577 B2 | 8/2007 | Fagin et al. |
| 7,287,068 B1 | 10/2007 | Eriksson et al. |
| 7,290,285 B2 | 10/2007 | McCurdy et al. |
| 7,298,851 B1 | 11/2007 | Hendricks et al. |
| 7,304,635 B2 | 12/2007 | Seet et al. |
| 7,310,629 B1 | 12/2007 | Mendelson et al. |
| 7,313,759 B2 | 12/2007 | Sinisi |
| 7,340,436 B1 | 3/2008 | Lilge |
| 7,349,901 B2 | 3/2008 | Ramarathnam et al. |
| 7,350,704 B2 | 4/2008 | Barsness et al. |
| 7,355,591 B2 | 4/2008 | Sugimoto |
| 7,375,649 B2 | 5/2008 | Gueziec |
| 7,383,505 B2 | 6/2008 | Shimizu et al. |
| 7,386,480 B2 | 6/2008 | Sarig |
| 7,386,804 B2 | 6/2008 | Ho et al. |
| 7,398,244 B1 | 7/2008 | Keith |
| 7,401,286 B1 | 7/2008 | Hendricks et al. |
| 7,454,238 B2 | 11/2008 | Vinayak et al. |
| 7,461,406 B2 | 12/2008 | Pelly et al. |
| 7,496,767 B2 | 2/2009 | Evans |
| 7,506,246 B2 | 3/2009 | Hollander et al. |
| 7,506,356 B2 | 3/2009 | Gupta et al. |
| 7,509,270 B1 | 3/2009 | Hendricks et al. |
| 7,519,278 B2 | 4/2009 | Ikeda et al. |
| 7,533,152 B2 | 5/2009 | Stark et al. |
| 7,539,478 B2 | 5/2009 | Herley et al. |
| 7,546,618 B2 | 6/2009 | Bacon |
| 7,562,032 B2 | 7/2009 | Abbosh et al. |
| 7,562,038 B1 | 7/2009 | Brumfield et al. |
| 7,574,653 B2 | 8/2009 | Croney et al. |
| 7,574,658 B2 | 8/2009 | Kisanuki |

(56) References Cited

U.S. PATENT DOCUMENTS

| | | |
|---|---|---|
| 7,631,013 B2 | 12/2009 | Parsons et al. |
| 7,634,429 B2 | 12/2009 | Narin et al. |
| 7,656,127 B1 | 2/2010 | Shutt et al. |
| 7,657,459 B2 | 2/2010 | Anderson et al. |
| 7,657,831 B2 | 2/2010 | Donahue |
| 7,680,849 B2 | 3/2010 | Heller et al. |
| 7,716,224 B2 | 5/2010 | Reztlaff, II et al. |
| 7,720,892 B1 | 5/2010 | Healey, Jr. et al. |
| 7,747,949 B2 | 6/2010 | Incertis Carro |
| 7,760,986 B2 | 7/2010 | Beuque |
| 7,788,369 B2 | 8/2010 | McAllen et al. |
| 7,792,756 B2 | 9/2010 | Plastina et al. |
| 7,835,989 B1 | 11/2010 | Hendricks et al. |
| 7,849,393 B1 | 12/2010 | Hendricks et al. |
| 7,865,405 B2 | 1/2011 | Hendricks et al. |
| 7,865,567 B1 | 1/2011 | Hendricks et al. |
| 7,865,817 B2 | 1/2011 | Ryan et al. |
| 7,870,022 B2 | 1/2011 | Bous et al. |
| 7,890,848 B2 | 2/2011 | Bodin et al. |
| 7,900,133 B2 | 3/2011 | Cragun et al. |
| 7,908,628 B2 | 3/2011 | Swart et al. |
| 7,920,112 B2 | 4/2011 | Kurihara et al. |
| 8,117,128 B2 | 2/2012 | Ishibashi |
| 8,131,647 B2 | 3/2012 | Siegel et al. |
| 8,165,998 B2 | 4/2012 | Semerdzhiev |
| 8,175,925 B1 | 5/2012 | Rouaix |
| 8,209,623 B2 | 6/2012 | Barletta et al. |
| 8,260,915 B1 | 9/2012 | Ashear |
| 8,312,096 B2 | 11/2012 | Cohen et al. |
| 8,341,210 B1 | 12/2012 | Lattyak et al. |
| 8,370,196 B2 | 2/2013 | Choi et al. |
| 8,370,341 B1 * | 2/2013 | Cromwell ......... G06F 17/30073 707/662 |
| 8,417,772 B2 | 4/2013 | Lin et al. |
| 8,429,028 B2 | 4/2013 | Hendricks et al. |
| 8,452,797 B1 | 5/2013 | Paleja et al. |
| 8,510,247 B1 | 8/2013 | Kane, Jr. et al. |
| 8,601,084 B2 | 12/2013 | Carlander |
| 8,631,451 B2 | 1/2014 | Bennett et al. |
| 8,725,565 B1 | 5/2014 | Ryan |
| 8,793,575 B1 | 7/2014 | Lattyak et al. |
| 9,137,322 B2 * | 9/2015 | Hamada ................ H04L 67/22 |
| 2001/0007980 A1 | 7/2001 | Ishibashi et al. |
| 2001/0025302 A1 | 9/2001 | Suzuki et al. |
| 2001/0026287 A1 | 10/2001 | Watanabe |
| 2001/0027450 A1 | 10/2001 | Shinoda et al. |
| 2001/0027478 A1 | 10/2001 | Meier et al. |
| 2001/0036822 A1 | 11/2001 | Mead et al. |
| 2001/0037328 A1 | 11/2001 | Pustejovsky et al. |
| 2001/0039493 A1 | 11/2001 | Pustejovsky et al. |
| 2001/0049623 A1 | 12/2001 | Aggarwal et al. |
| 2001/0050658 A1 | 12/2001 | Adams |
| 2001/0053975 A1 | 12/2001 | Kurihara |
| 2002/0002540 A1 | 1/2002 | DeMello et al. |
| 2002/0010707 A1 | 1/2002 | Chang et al. |
| 2002/0010759 A1 | 1/2002 | Hitson et al. |
| 2002/0012134 A1 | 1/2002 | Calaway |
| 2002/0023010 A1 * | 2/2002 | Rittmaster et al. ............. 705/26 |
| 2002/0026443 A1 | 2/2002 | Chang et al. |
| 2002/0035697 A1 | 3/2002 | McCurdy et al. |
| 2002/0046261 A1 | 4/2002 | Iwata et al. |
| 2002/0049717 A1 | 4/2002 | Routtenberg et al. |
| 2002/0054059 A1 | 5/2002 | Schneiderman |
| 2002/0057286 A1 | 5/2002 | Markel et al. |
| 2002/0059415 A1 | 5/2002 | Chang et al. |
| 2002/0069222 A1 | 6/2002 | McNeely |
| 2002/0069312 A1 | 6/2002 | Jones |
| 2002/0087532 A1 | 7/2002 | Barritz et al. |
| 2002/0090934 A1 | 7/2002 | Mitchelmore |
| 2002/0091584 A1 | 7/2002 | Clark et al. |
| 2002/0092031 A1 | 7/2002 | Dudkiewicz et al. |
| 2002/0095468 A1 | 7/2002 | Sakata |
| 2002/0101447 A1 | 8/2002 | Carro |
| 2002/0103809 A1 | 8/2002 | Starzl et al. |
| 2002/0111907 A1 * | 8/2002 | Ling ............................. 705/41 |
| 2002/0120635 A1 | 8/2002 | Joao |
| 2002/0123336 A1 | 9/2002 | Kamada |
| 2002/0129012 A1 | 9/2002 | Green |
| 2002/0138291 A1 | 9/2002 | Vaidyanathan et al. |
| 2002/0138649 A1 | 9/2002 | Cartmell et al. |
| 2002/0143822 A1 | 10/2002 | Brid et al. |
| 2002/0147724 A1 | 10/2002 | Fries et al. |
| 2002/0152473 A1 | 10/2002 | Unger |
| 2002/0154157 A1 | 10/2002 | Sherr et al. |
| 2002/0165707 A1 | 11/2002 | Call |
| 2002/0184319 A1 | 12/2002 | Willner et al. |
| 2002/0194474 A1 | 12/2002 | Natsuno et al. |
| 2003/0005002 A1 | 1/2003 | Chen et al. |
| 2003/0009459 A1 | 1/2003 | Chastain et al. |
| 2003/0012216 A1 | 1/2003 | Novaes |
| 2003/0018720 A1 | 1/2003 | Chang et al. |
| 2003/0025731 A1 | 2/2003 | Chastain et al. |
| 2003/0028395 A1 | 2/2003 | Rodgers et al. |
| 2003/0040970 A1 | 2/2003 | Miller |
| 2003/0046233 A1 | 3/2003 | Ara et al. |
| 2003/0052928 A1 | 3/2003 | Williams |
| 2003/0056139 A1 | 3/2003 | Murray et al. |
| 2003/0058265 A1 | 3/2003 | Robinson et al. |
| 2003/0065642 A1 | 4/2003 | Zee |
| 2003/0069812 A1 | 4/2003 | Yuen et al. |
| 2003/0076513 A1 | 4/2003 | Sugimoto et al. |
| 2003/0078986 A1 * | 4/2003 | Ayres et al. .................. 709/217 |
| 2003/0085916 A1 | 5/2003 | Thiry et al. |
| 2003/0090572 A1 | 5/2003 | Belz et al. |
| 2003/0093312 A1 | 5/2003 | Ukita et al. |
| 2003/0093382 A1 | 5/2003 | Himeno et al. |
| 2003/0097354 A1 | 5/2003 | Finlay et al. |
| 2003/0097361 A1 | 5/2003 | Huang et al. |
| 2003/0105679 A1 | 6/2003 | Krishnan et al. |
| 2003/0110503 A1 | 6/2003 | Perkes |
| 2003/0126123 A1 | 7/2003 | Kodama |
| 2003/0129963 A1 | 7/2003 | Nurcahya |
| 2003/0135495 A1 | 7/2003 | Vagnozzi |
| 2003/0152894 A1 | 8/2003 | Townshend |
| 2003/0163399 A1 | 8/2003 | Harper et al. |
| 2003/0164844 A1 | 9/2003 | Kravitz et al. |
| 2003/0182551 A1 | 9/2003 | Frantz et al. |
| 2003/0190145 A1 | 10/2003 | Copperman et al. |
| 2003/0191737 A1 | 10/2003 | Steele et al. |
| 2003/0204496 A1 | 10/2003 | Ray et al. |
| 2003/0212613 A1 | 11/2003 | Sarig |
| 2004/0002943 A1 | 1/2004 | Merrill et al. |
| 2004/0003344 A1 | 1/2004 | Lai et al. |
| 2004/0003398 A1 | 1/2004 | Donian et al. |
| 2004/0015467 A1 | 1/2004 | Fano |
| 2004/0019564 A1 | 1/2004 | Goldthwaite et al. |
| 2004/0023191 A1 | 2/2004 | Brown et al. |
| 2004/0030686 A1 | 2/2004 | Cardno et al. |
| 2004/0044723 A1 | 3/2004 | Bell et al. |
| 2004/0054499 A1 | 3/2004 | Starzyk et al. |
| 2004/0068471 A1 | 4/2004 | Kato |
| 2004/0078273 A1 | 4/2004 | Loeb et al. |
| 2004/0078757 A1 | 4/2004 | Golovchinsky et al. |
| 2004/0081300 A1 | 4/2004 | Takae et al. |
| 2004/0088328 A1 * | 5/2004 | Cook et al. ................. 707/104.1 |
| 2004/0098350 A1 | 5/2004 | Labrou et al. |
| 2004/0117189 A1 | 6/2004 | Bennett |
| 2004/0120280 A1 | 6/2004 | Western |
| 2004/0128359 A1 | 7/2004 | Horvitz et al. |
| 2004/0128539 A1 | 7/2004 | Shureih |
| 2004/0139400 A1 | 7/2004 | Allam et al. |
| 2004/0167822 A1 | 8/2004 | Chasen et al. |
| 2004/0181467 A1 | 9/2004 | Raiyani et al. |
| 2004/0201633 A1 | 10/2004 | Barsness et al. |
| 2004/0205457 A1 | 10/2004 | Bent et al. |
| 2004/0210561 A1 | 10/2004 | Shen |
| 2004/0212941 A1 | 10/2004 | Haas et al. |
| 2004/0229194 A1 | 11/2004 | Yang |
| 2004/0237033 A1 | 11/2004 | Woolf et al. |
| 2004/0239703 A1 | 12/2004 | Angelica |
| 2004/0243613 A1 | 12/2004 | Pourheidari |
| 2004/0252692 A1 | 12/2004 | Shim et al. |
| 2004/0254013 A1 | 12/2004 | Quraishi et al. |
| 2004/0254917 A1 | 12/2004 | Brill et al. |

(56) References Cited

U.S. PATENT DOCUMENTS

| | | |
|---|---|---|
| 2004/0267552 A1 | 12/2004 | Gilliam et al. |
| 2004/0268253 A1 | 12/2004 | DeMello et al. |
| 2005/0021464 A1 | 1/2005 | Lindauer et al. |
| 2005/0022113 A1 | 1/2005 | Hanlon |
| 2005/0044148 A1 | 2/2005 | Son et al. |
| 2005/0044224 A1 | 2/2005 | Jun et al. |
| 2005/0066219 A1 | 3/2005 | Hoffman et al. |
| 2005/0069225 A1 | 3/2005 | Schneider et al. |
| 2005/0069849 A1 | 3/2005 | McKinney et al. |
| 2005/0076012 A1 | 4/2005 | Manber et al. |
| 2005/0086514 A1* | 4/2005 | Han et al. ............... 713/200 |
| 2005/0088410 A1 | 4/2005 | Chaudhri |
| 2005/0091604 A1 | 4/2005 | Davis |
| 2005/0097007 A1 | 5/2005 | Alger et al. |
| 2005/0102618 A1 | 5/2005 | Naito |
| 2005/0125222 A1 | 6/2005 | Brown et al. |
| 2005/0132281 A1 | 6/2005 | Pan et al. |
| 2005/0138007 A1 | 6/2005 | Amitay |
| 2005/0138428 A1 | 6/2005 | McAllen et al. |
| 2005/0144221 A1 | 6/2005 | Shin et al. |
| 2005/0144895 A1 | 7/2005 | Grimes et al. |
| 2005/0149985 A1 | 7/2005 | Okamoto |
| 2005/0154601 A1 | 7/2005 | Halpern et al. |
| 2005/0176438 A1 | 8/2005 | Li |
| 2005/0177562 A1 | 8/2005 | Raciborski |
| 2005/0177567 A1 | 8/2005 | Hughes et al. |
| 2005/0193330 A1 | 9/2005 | Peters |
| 2005/0195975 A1 | 9/2005 | Kawakita |
| 2005/0198070 A1 | 9/2005 | Lowry |
| 2005/0222977 A1 | 10/2005 | Zhou et al. |
| 2005/0223315 A1 | 10/2005 | Shimizu et al. |
| 2005/0228836 A1 | 10/2005 | Bacastow et al. |
| 2005/0250439 A1 | 11/2005 | Leslie |
| 2005/0256822 A1 | 11/2005 | Hollingsworth |
| 2005/0257261 A1 | 11/2005 | Shraim et al. |
| 2005/0262258 A1 | 11/2005 | Kohno et al. |
| 2005/0289394 A1 | 12/2005 | Arrouye et al. |
| 2006/0004840 A1 | 1/2006 | Senda |
| 2006/0020469 A1 | 1/2006 | Rast |
| 2006/0031316 A1 | 2/2006 | Forstadius |
| 2006/0045470 A1 | 3/2006 | Poslinski et al. |
| 2006/0047830 A1 | 3/2006 | Nair et al. |
| 2006/0047844 A1 | 3/2006 | Deng |
| 2006/0048047 A1 | 3/2006 | Tao |
| 2006/0048184 A1 | 3/2006 | Poslinski et al. |
| 2006/0053045 A1 | 3/2006 | Danielson et al. |
| 2006/0057960 A1 | 3/2006 | Tran |
| 2006/0061595 A1 | 3/2006 | Goede et al. |
| 2006/0069697 A1 | 3/2006 | Shraim et al. |
| 2006/0071754 A1 | 4/2006 | Tofts et al. |
| 2006/0075205 A1 | 4/2006 | Martin et al. |
| 2006/0075444 A1 | 4/2006 | Dillen |
| 2006/0077897 A1 | 4/2006 | Kotzin |
| 2006/0080261 A1 | 4/2006 | Christal |
| 2006/0095404 A1 | 5/2006 | Adelman et al. |
| 2006/0095459 A1 | 5/2006 | Adelman et al. |
| 2006/0098900 A1 | 5/2006 | King et al. |
| 2006/0101328 A1 | 5/2006 | Albornoz et al. |
| 2006/0123053 A1 | 6/2006 | Scannell, Jr. |
| 2006/0129618 A1 | 6/2006 | Maier |
| 2006/0129924 A1 | 6/2006 | Nelson et al. |
| 2006/0143558 A1 | 6/2006 | Albornoz et al. |
| 2006/0156222 A1 | 7/2006 | Chi et al. |
| 2006/0161578 A1 | 7/2006 | Siegel et al. |
| 2006/0161635 A1 | 7/2006 | Lamkin et al. |
| 2006/0175983 A1 | 8/2006 | Crouse et al. |
| 2006/0179137 A1 | 8/2006 | Jennings, III et al. |
| 2006/0190489 A1 | 8/2006 | Vohariwatt et al. |
| 2006/0190568 A1 | 8/2006 | Patterson |
| 2006/0195431 A1 | 8/2006 | Holzgrafe et al. |
| 2006/0209175 A1 | 9/2006 | Cohen et al. |
| 2006/0235803 A1 | 10/2006 | Romney |
| 2006/0236240 A1 | 10/2006 | Lebow |
| 2006/0240799 A1 | 10/2006 | Kim et al. |
| 2006/0250994 A1 | 11/2006 | Sasaki et al. |
| 2006/0253441 A1 | 11/2006 | Nelson |
| 2006/0253458 A1 | 11/2006 | Dixon et al. |
| 2006/0253461 A1 | 11/2006 | de Bonet |
| 2006/0256083 A1 | 11/2006 | Rosenberg |
| 2006/0265518 A1 | 11/2006 | Owens et al. |
| 2006/0271629 A1 | 11/2006 | MacDowell |
| 2006/0281058 A1 | 12/2006 | Mangoaela |
| 2006/0282797 A1 | 12/2006 | Barsness et al. |
| 2007/0005570 A1* | 1/2007 | Hurst-Hiller et al. ............... 707/3 |
| 2007/0005616 A1 | 1/2007 | Hay et al. |
| 2007/0005757 A1 | 1/2007 | Finger et al. |
| 2007/0014404 A1 | 1/2007 | Cha |
| 2007/0016555 A1 | 1/2007 | Ito et al. |
| 2007/0025704 A1 | 2/2007 | Tsukazaki et al. |
| 2007/0039023 A1 | 2/2007 | Kataoka |
| 2007/0050346 A1 | 3/2007 | Goel et al. |
| 2007/0055926 A1 | 3/2007 | Christiansen et al. |
| 2007/0061335 A1 | 3/2007 | Ramer et al. |
| 2007/0061337 A1 | 3/2007 | Saito et al. |
| 2007/0061803 A1 | 3/2007 | Barrett |
| 2007/0073596 A1 | 3/2007 | Alexander et al. |
| 2007/0078273 A1 | 4/2007 | Hirota |
| 2007/0079236 A1 | 4/2007 | Schrier et al. |
| 2007/0079383 A1 | 4/2007 | Gopalakrishnan |
| 2007/0094285 A1 | 4/2007 | Agichtein et al. |
| 2007/0094351 A1 | 4/2007 | Kalish et al. |
| 2007/0105536 A1 | 5/2007 | Tingo, Jr. |
| 2007/0112817 A1 | 5/2007 | Danninger |
| 2007/0118533 A1 | 5/2007 | Ramer et al. |
| 2007/0130109 A1 | 6/2007 | King et al. |
| 2007/0136660 A1 | 6/2007 | Gurcan et al. |
| 2007/0136679 A1 | 6/2007 | Yang |
| 2007/0142934 A1 | 6/2007 | Boercsoek et al. |
| 2007/0150456 A1* | 6/2007 | Lian ............... G06F 17/30722 |
| 2007/0162961 A1 | 7/2007 | Tarrance et al. |
| 2007/0174545 A1 | 7/2007 | Okada et al. |
| 2007/0185865 A1 | 8/2007 | Budzik et al. |
| 2007/0189719 A1 | 8/2007 | Furumachi et al. |
| 2007/0201702 A1 | 8/2007 | Hendricks et al. |
| 2007/0219983 A1 | 9/2007 | Fish |
| 2007/0220419 A1 | 9/2007 | Stibel et al. |
| 2007/0233562 A1 | 10/2007 | Lidwell et al. |
| 2007/0233692 A1 | 10/2007 | Lisa et al. |
| 2007/0234209 A1 | 10/2007 | Williams |
| 2007/0238077 A1 | 10/2007 | Strachar |
| 2007/0240187 A1 | 10/2007 | Beach et al. |
| 2007/0242225 A1 | 10/2007 | Bragg et al. |
| 2007/0250573 A1 | 10/2007 | Rothschild |
| 2007/0282809 A1 | 12/2007 | Hoeber et al. |
| 2007/0283158 A1 | 12/2007 | Danseglio |
| 2007/0283173 A1 | 12/2007 | Webb et al. |
| 2007/0288853 A1 | 12/2007 | Neil |
| 2008/0005097 A1 | 1/2008 | Kleewein et al. |
| 2008/0005203 A1 | 1/2008 | Bots et al. |
| 2008/0005664 A1 | 1/2008 | Chandra |
| 2008/0016064 A1 | 1/2008 | Sareday et al. |
| 2008/0016164 A1 | 1/2008 | Chandra |
| 2008/0027933 A1 | 1/2008 | Hussam |
| 2008/0031595 A1 | 2/2008 | Cho |
| 2008/0040233 A1 | 2/2008 | Wildman et al. |
| 2008/0059702 A1 | 3/2008 | Lu et al. |
| 2008/0066155 A1 | 3/2008 | Abraham |
| 2008/0082518 A1 | 4/2008 | Loftesness |
| 2008/0082911 A1 | 4/2008 | Sorotokin et al. |
| 2008/0089665 A1 | 4/2008 | Thambiratnam et al. |
| 2008/0113614 A1 | 5/2008 | Rosenblatt |
| 2008/0115224 A1 | 5/2008 | Jogand-Coulomb et al. |
| 2008/0120101 A1 | 5/2008 | Johnson et al. |
| 2008/0120280 A1 | 5/2008 | Iijima et al. |
| 2008/0133479 A1 | 6/2008 | Zelevinsky et al. |
| 2008/0154908 A1 | 6/2008 | Datar et al. |
| 2008/0163039 A1 | 7/2008 | Ryan et al. |
| 2008/0164304 A1 | 7/2008 | Narasimhan et al. |
| 2008/0165141 A1 | 7/2008 | Christie |
| 2008/0168073 A1 | 7/2008 | Siegel et al. |
| 2008/0208833 A1 | 8/2008 | Basmov |
| 2008/0222552 A1 | 9/2008 | Batarseh et al. |
| 2008/0235351 A1 | 9/2008 | Banga et al. |
| 2008/0243788 A1 | 10/2008 | Reztlaff et al. |

(56) References Cited

U.S. PATENT DOCUMENTS

| | | | |
|---|---|---|---|
| 2008/0243814 A1 | 10/2008 | Gurcan et al. | |
| 2008/0243828 A1 | 10/2008 | Reztlaff et al. | |
| 2008/0259057 A1 | 10/2008 | Brons | |
| 2008/0270930 A1 | 10/2008 | Slosar | |
| 2008/0281058 A1 | 11/2008 | Araki | |
| 2008/0293450 A1 | 11/2008 | Ryan et al. | |
| 2008/0294674 A1 | 11/2008 | Reztlaff et al. | |
| 2008/0295039 A1 | 11/2008 | Nguyen et al. | |
| 2008/0298083 A1 | 12/2008 | Watson et al. | |
| 2008/0301820 A1 | 12/2008 | Stevens | |
| 2008/0320396 A1 | 12/2008 | Mizrachi et al. | |
| 2009/0094528 A1 | 4/2009 | Gray et al. | |
| 2009/0094540 A1 | 4/2009 | Gray et al. | |
| 2009/0181649 A1 | 7/2009 | Bull et al. | |
| 2009/0228774 A1 | 9/2009 | Matheny et al. | |
| 2009/0241054 A1 | 9/2009 | Hendricks | |
| 2009/0263777 A1 | 10/2009 | Kohn | |
| 2009/0296331 A1 | 12/2009 | Choy | |
| 2009/0319482 A1 | 12/2009 | Norlander et al. | |
| 2010/0023259 A1 | 1/2010 | Krumm et al. | |
| 2010/0081120 A1 | 4/2010 | Nanjiani et al. | |
| 2010/0125876 A1 | 5/2010 | Craner et al. | |
| 2010/0131385 A1 | 5/2010 | Harrang et al. | |
| 2010/0188327 A1 | 7/2010 | Frid et al. | |
| 2010/0284036 A1 | 11/2010 | Ahn et al. | |
| 2011/0050591 A1 | 3/2011 | Kim et al. | |
| 2011/0112671 A1 | 5/2011 | Weinstein | |
| 2011/0191710 A1 | 8/2011 | Jang et al. | |
| 2011/0267333 A1 | 11/2011 | Sakamoto et al. | |
| 2011/0295926 A1 | 12/2011 | Battiston et al. | |
| 2012/0016774 A1 | 1/2012 | Dicke et al. | |
| 2012/0036431 A1 | 2/2012 | Ito et al. | |
| 2012/0041941 A1 | 2/2012 | King et al. | |
| 2012/0079372 A1 | 3/2012 | Kandekar et al. | |
| 2012/0227001 A1 | 9/2012 | Gupta et al. | |
| 2012/0240081 A1* | 9/2012 | Sim | G06Q 10/10 715/811 |
| 2013/0138531 A1* | 5/2013 | Baughman | G06Q 30/0631 705/26.7 |
| 2013/0219320 A1 | 8/2013 | Seet et al. | |
| 2013/0246157 A1 | 9/2013 | Puppin et al. | |
| 2013/0326253 A1 | 12/2013 | Lam et al. | |
| 2014/0218286 A1 | 8/2014 | Kim | |
| 2015/0269488 A1* | 9/2015 | Galai | H04L 67/22 706/11 |

FOREIGN PATENT DOCUMENTS

| | | |
|---|---|---|
| CN | 101120358 | 2/2008 |
| EP | 1197902 | 4/2002 |
| EP | 1842150 A2 | 10/2007 |
| JP | 6274493 A | 9/1994 |
| JP | 07078139 | 3/1995 |
| JP | 09179870 | 7/1997 |
| JP | 10091640 | 4/1998 |
| JP | 11074882 | 3/1999 |
| JP | 2000501214 | 2/2000 |
| JP | 2001052016 | 2/2001 |
| JP | 2001052025 | 2/2001 |
| JP | 2001100702 A | 4/2001 |
| JP | 2001195412 | 7/2001 |
| JP | 2001236358 | 8/2001 |
| JP | 2002099739 A | 4/2002 |
| JP | 2002197079 A | 7/2002 |
| JP | 2002259718 | 9/2002 |
| JP | 2002536736 | 10/2002 |
| JP | 2003016104 | 1/2003 |
| JP | 2003122969 | 4/2003 |
| JP | 2003513384 | 4/2003 |
| JP | 2003516585 | 5/2003 |
| JP | 2003517158 | 5/2003 |
| JP | 2003186910 | 7/2003 |
| JP | 2005056041 | 3/2005 |
| JP | 2006011694 | 1/2006 |
| JP | 2006107496 | 4/2006 |
| JP | 2006129323 | 5/2006 |
| JP | 2006190114 | 7/2006 |
| JP | 2008071334 | 3/2008 |
| JP | 2008516297 | 5/2008 |
| JP | 2008527580 | 7/2008 |
| JP | 2008197634 | 8/2008 |
| KR | 1020020020262 | 3/2002 |
| KR | 1020050038645 | 4/2005 |
| WO | WO97/20274 | 6/1997 |
| WO | WO9720274 | 6/1997 |
| WO | WO00/45588 | 8/2000 |
| WO | WO0045588 | 8/2000 |
| WO | WO0056055 A2 | 9/2000 |
| WO | WO0075840 A2 | 12/2000 |
| WO | WO01/42978 | 6/2001 |
| WO | WO0239206 | 5/2002 |
| WO | WO2004055647 A2 | 7/2004 |
| WO | WO2006078728 A2 | 7/2006 |

OTHER PUBLICATIONS

The Mintues of the Oral Proceedings mailed on Nov. 27, 2014 for European patent application No. 06718773.2, a counterpart foreign application of U.S. Pat. No. 8,131,647, 13 pages.

The European Office Action mailed Nov. 27, 2014 for European patent application No. 06718773.2, a counterpart foreign application of U.S. Pat. No. 8,131,647, 31 pages.

Translated Copy of the Japanese Office Action mailed Dec. 16, 2014 for Japanese patent application No. 2009-544304, a counterpart foreign application of U.S. Appl. No. 11/693,677, 2 pages.

Translated copy of the Korean Office Action mailed Dec. 19, 2014 for Korean patent application No. 10-2009-7024280, a counterpart foreign application of U.S. Appl. No. 11/763,374, 10 pages.

Final Office Action for U.S. Appl. No. 13/284,446, mailed on Oct. 31, 2014, Linsey R. Hansen, "Indicators for Navigating Digital Works", 17 pages.

Final Office Action for U.S. Appl. No. 13/959,589, mailed on Nov. 6, 2014, Thomas A. Ryan, "Administrative Tasks in a Media Consumption System", 29 pages.

Office Action for U.S. Appl. No. 14/179,380, mailed on Dec. 19, 2014, Girish Bansilal Bajaj, "Providing User-Supplied Items to a User Device", 11 pages.

Final Office Action for U.S. Appl. No. 11/763,395, mailed May 9, 2012, Thomas Ryan et al., "Providing Supplemental Information Based on Hints in a Media Consumption System", 12 pages.

Final Office Action for U.S. Appl. No. 11/763,314, mailed on Jun. 13, 2011, Craig S. Griffin, "Display Dependent Markup Language".

Office action for U.S. Appl. No. 11/763,390, mailed on Jun. 27, 2012, Bajaj et al., "Providing User-Supplied Items to a User Device", 7 pages.

Office action for U.S. Appl. No. 11/763,392, mailed on Jun. 27, 2012, Ryan et al., "Administrative Tasks in a Media Consumption System", 47 pages.

Office action for U.S. Appl. No. 13/294,803, mailed on Jun. 4, 2013, Lattyak et al., "Progress Indication for a Digital Work", 26 pages.

Non-Final Office Action for U.S. Appl. No. 12/943,211, mailed on Jun. 6, 2012, James. R. Retzlaff II et al., "Obtaining and Verifying Search Indices", 10 pages.

Office action for U.S. Appl. No. 12/759,828, mailed on Jun. 6, 2013, Reztlaff, II et al., "Search and Indexing on a User Device", 27 pages.

Non-Final Office Action for U.S. Appl. No. 11/763,369 mailed on Jun. 7, 2012, James R. Reztlaff II et al., "Search of Multiple Content Sources on a User Device", 20 pages.

Non-Final Office Action for U.S. Appl. No. 11/693,682, mailed on Jun. 9, 2011, Hilliard B. Siegel, "Providing Annotations of a Digital Work".

Office action for U.S. Appl. No. 12/333,215, mailed on Jul. 18, 2011, Zagorie et al., "Device-Specific Presentation Control for Electronic Book Reader Devices", 22 pages.

Office Action for U.S. Appl. No. 12/360,089, mailed on Jul. 3, 2013, Killalea et al., "Aggregation of Highlights", 14 pages.

Non-Final Office Action dated Jul. 6, 2011 for U.S. Appl. No. 11/693,685, John Lattyak, "Relative Progress and Event Indicators".

(56) References Cited

OTHER PUBLICATIONS

Office action for U.S. Appl. No. 12/414,914, mailed on Aug. 4, 2011, Agarwal et al., "Questions on Highlighted Passages", 39 pages.
Zobel, J. et al., "Inverted Files for Text Search Engines" ACM Computing Surveys, vol. 38, No. 2, Jul. 1, 2006, pp. 1-56, NY, NY.
Office action for U.S. Appl. No. 11/693,685, mailed on Aug. 15, 2013, Lattyak et al., "Relative Progress and Event Indicators", 24 pages.
Office action for U.S. Appl. No. 11/763,376, mailed on Aug. 19, 2013, Kiraly et al., "Notification of a User Device to Perform an Action", 16 pages.
Non-final Office Action for U.S. Appl. No. 11/537,484, mailed on Aug. 19, 2011, Thomas A. Ryan, "Expedited Acquisition of a Digital Item Following a Sample Presentation of the Item", 13 pages.
Non-final Office Action for U.S. Appl. No. 11/763,363, mailed on Aug. 26, 2011, James R. Rezlaff II, "Search Results Generation and Sorting", 10 pages.
Office action for U.S. Appl. No. 11/537,484, mailed on Aug. 27, 2013, Ryan, "Expedited Acquisition of a Digital Item Following a Sample Presentation of the Item", 13 pages.
Non-Final Office Action for U.S. Appl. No. 11/763,358, mailed on Sep. 12, 2011, James R. Retzlaff II, "Managing Status of Search Index Generation", 11 pages.
Office action for U.S. Appl. No. 12/414,914, mailed on Sep. 13, 2013, Agarwal et al, "Questions on Highlighted Passages", 35 pages.
Final Office Action for U.S. Appl. No. 11/763,369, mailed on Sep. 16, 2013, James R. Reztlaff II et al., "Search of Multiple Content Sources on a User Device", 23 pages.
Office Action for U.S. Appl. No. 13/294,803, mailed on Sep. 24, 2013, John Lattyak, "Progress Indication for a Digital Work", 27 pages.
Final Office Action for U.S. Appl. No. 11/963,618, mailed on Sep. 26, 2011, Michael Rykov, "Dissemination of Periodical Samples", 15 pages.
Non-Final Office Action for U.S. Appl. No. 11/763,374, mailed on Sep. 27, 2011, Thomas Ryan, "Consumption of Items via a User Device", 17 pages.
Office action for U.S. Appl. No. 13/722,961, mailed on Sep. 5, 2013, Lattyak et al., "Delivery of Items for Consumption by a User Device", 6 pages.
Oki et al., "The Information Bus-An Architecture for Extensive Distributed Systems", ACM, Dec. 5-8, 1993, 11 pages.
OQO "A Full PC That Fits in Your Pocket" Retrieved on Sep. 22, 2008 at <<http://www.oqo.com/support/documentation.html>>.
Palm Reader Handbook, Palm Inc., Dec. 2000, 56 pages.
PCT International Search Report and the Written Opinion for Application No. PCT/US 08/64389, mailed on Jan. 28, 2009, 7 pgs.
International Search Report mailed Sep. 9, 2008, in International Application No. PCT/US/08/64387, filed May 21, 2008, 1 page.
International Search Report mailed Aug. 15, 2008, in International Application No. PCT/US07/89105, filed Dec. 28, 2007, 2 pages.
International Search Report mailed Aug. 15, 2008, in corresponding International Application No. PCT/US08/57829, filed Mar. 21, 2008, 1 page.
International Search Report mailed Jul. 7, 2008, in International Application No. PCT/US08/57848, filed Mar. 31, 2008, 2 pages.
International Search Report mailed Sep. 9, 2008, in International Application No. PCT/US08/64387, filed May 21, 2008, 1 page.
PCT Search Report for PCT Application No. PCT/US10/22060, mailed Mar. 8, 2010 (7 pages).
PCT International Search Report and the Written Opinion for Application No. PCT/US2006/001752, mailed on Jul. 27, 2006, 8 pgs.
"Say No To Third Voice," Worldzone.net, 1999-2004, <http://worldzone.netiinternetipixelsnttv/index.html> [retrieved Jan. 30, 2004].
"Shape Memory Polymer", retrieved on May 7, 2009 at<<http://en.wikipedia.org/wiki/Shape_Memory_Polymer>>, Wikipedia, 8 pgs.
Sohn et al. "Development of a Standard Format for eBooks", SAC2002, Madrid, Spain, Mar. 2002 ACM 1-58113-445-2/02/0.

"The Berkman Center for Internet & Society at Harvard Law School: Annotation Engine," Harvard.Edu, 1999-2004, <http://cyber.iaw.harvard.eduJprojects/annotate.html> [Retrieved Jan. 30, 2004].
Marshall, C.C., "The Future of Annotation in a Digital (Paper) World," Proceedings o/the 35th Annual GSLIS Clinic, University of Illinois at UrbanaChampaign, Urbana, 11, Mar. 22-24, 1998, pp. 1-19.
Kumar, A., "Third Voice Trails off . . . ," Wired News, 2004, <http://www.wired.comlnews/printIO. 1294,42803 ,00.html> [retrieved Jan. 30, 2004].
"Trilogy Definition", Merriam-Webster's Collegiate Dictionary, Tenth Edition, 1999, 2 pages.
"Universal Unique Identifier", dated Dec. 16, 2002. The Open Group, all pages. Retrieved on Apr. 21, 2010 via Wayback Machine at http://web.archive.org/web/20021216070918/http://www.opengroup.org/onlinepubs/9629399/apdxa.htm.
"Web Services Architecture: W3C Working Group Note Feb. 11, 2004", W3C, all pages. Retrieved on Apr. 21, 2010 via Wayback Machine at http://web.archive.org/web/2004040205185/http://www.w3.org/TR/ws-arch/.
Wellman, et al., "Mechanical Design and Control of a High-Bandwidth Shape Memory Alloy Tactile Display", Springer-Verlag, In the Proceedings of the International Symposium on Experimental Robotics, Barcelona, Spain, Jun. 1997, pp. 56-66, 12 pgs.
Yoshikawa, et al., "Vertical Drive Micro Actuator for Haptic Display Using Shape Memory Alloy Thin Film", IEE Japan, Papers of Technical Meeting on Micromachine and Sensor System, Journal Code L2898B, vol. MSS-05, No. 21-44, 2005, pp. 103-108.
Ziviani, N Ed, Baeza-Yates R. et at: "Modern Information Retrieval, Text Operations", Jan. 1, 1999, Modern Information Retrieval, ACM Press, NY, pp. 163-190.
U.S. Appl. No. 11/277,894, filed Mar. 29, 2006, Jateen P. Parekh, Gregg E Zehr, and Subram Narasimhan, "Reader Device Content Indexing".
U.S. Appl. No. 11/537,484, filed Sep. 29, 2006, Thomas Ryan, "Expedited Acquisition of a Digital Item Following a Sample Presentation of the Item."
U.S. Appl. No. 11/537,518, filed Sep. 29, 2006, John Lattyak, "Acquisition of an Item based on a Catalog Presentation of Items."
U.S. Appl. No. 11/693,685, filed Mar. 29, 2007, John Lattyak; John Kim; Steven Moy; Laurent An Minh Nguyen, "Relative Progress and Event Indicators."
U.S. Appl. No. 11/763,314, filed Jun. 14, 2007, John Lattyak; Craig Griffin; Steven Weiss, "Display Dependent Markup Language."
U.S. Appl. No. 11/763,339, filed Jun. 14, 2007, David Isbister; Marshall Willilams; Nicholas Vaccaro, "Power Management Techniques for a User Device."
U.S. Appl. No. 11/763,357, filed Jun. 14, 2007, James Reztlaff II; John Lattyak, "Obtaining and Verifying Search Indices."
U.S. Appl. No. 11/763,363, filed Jun. 14, 2007, James Reztlaff II; Thomas Ryan, "Search Results Generation and Sorting."
U.S. Appl. No. 11/763,375, filed Jun. 14, 2007, John Lattyak, Girish Bansil Bajaj, Kevin R. Cheung, Thomas Fruchterman, Robert L. Goodwin, Kenneth P. Kiraly, Richard Moore, Subram Narasimhan, Thomas A. Ryan, Michael V. Rykov, Jon Saxton, James C. Slezak, Beryl Tomay, Aviram Zagorie, Gregg Elliott Zehr, "Delivery of Items for Consumption by a User Device."
U.S. Appl. No. 11/763,376, filed Jun. 14, 2007, Kenneth Kiraly; Thomas Ryan; Gregg Zehr; John Lattyak; Michael Rykov; Girish Bansilal Bajaj; James Slezak; Aviram Zagorie; Richard Moore; Kevin Cheung; Thomas Fruchterman; Robert Goodwin, "Notification of a User Device to Perform an Action."
U.S. Appl. No. 11/763,378, filed Jun. 14, 2007, John Lattyak; Thomas Ryan; Gregg Zehr; Kenneth Kiraly; Michael Rykov; Girish Bansilal Bajaj; James Slezak; Aviram Zagorie; Richard Moore; Kevin Cheung; Thomas Fruchterman; Robert Goodwin; Xiaotian Guo, "Transfer of Instructions to a User Device."
U.S. Appl. No. 11/763,381, filed Jun. 14, 2007, Michael Rykov; Girish Bansilal Bajaj; James Slezak; Aviram Zagorie; Richard Moore; Kevin Cheung; Thomas Fruchterman; Robert Goodwin, "Selecting and Providing Items in a Media Consumption System."
U.S. Appl. No. 11/763,386, filed Jun. 14, 2007, Thomas Ryan; Gregg Zehr; Kenneth Kiraly; John Lattyak; Michael Rykov; Girish Bansilal

(56) References Cited

OTHER PUBLICATIONS

Bajaj; James Slezak; Aviram Zagorie; Richard Moore; Kevin Cheung; Thomas Fruchterman; Robert Goodwin, "Handling of Subscription-Related Issues in a Media Consumption System."
U.S. Appl. No. 11/763,390, filed Jun. 14, 2007, Girish Bansilal Bajaj; Michael Rykov; James Slezak; Aviram Zagorie; Richard Moore; Kevin Cheung; Thomas Fruchterman; Robert Goodwin "Providing User-Supplied Items to a User Device."
U.S. Appl. No. 11/763,392, filed Jun. 14, 2007, Thomas Ryan; Gregg Zehr; Kenneth Kiraly; John Lattyak; Subram Narasimhan; Michael Rykov; Girish Bansilal Bajaj; James Slezak; Aviram Zagorie; Richard Moore; Kevin Cheung; Thomas Fruchterman; Robert Goodwin, "Administrative Tasks in a Media Consumption System."
U.S. Appl. No. 11/763,393, filed Jun. 14, 2007, John Lattyak; Michael Rykov; Girish Bansilal Bajaj; James Slezak; Aviram Zagorie; Richard Moore; Kevin Cheung; Thomas Fruchterman; Robert Goodwin "Incremental Updates of Items."
U.S. Appl. No. 11/763,395, filed Jun. 14, 2007, Thomas Ryan; Gregg Zehr; Kenneth Kiraly; John Lattyak; Michael Rykov; Girish Bansilal Bajaj; James Slezak; Aviram Zagorie; Richard Moore; Kevin Cheung; Thomas Fruchterman; Robert Goodwin; James Reztlaff II, "Providing Supplemental Information Based on Hints in a Media Consumption System."
U.S. Appl. No. 11/963,618, filed Dec. 21, 2007, Michael Rykov; Laurent An Minh Nguyen; Steven Moy, "Dissemination of Periodical Samples."
U.S. Appl. No. 12/333,215, filed Dec. 11, 2008, Aviram Zagorie; Craig Griffin; John Lattyak; Michael Rykov, "Device-Specific Presentation Control for Electronic Book Reader Devices."
U.S. Appl. No. 12/351,629, filed Jan. 9, 2009, John Johnston; Weiping Dou; Steven Chase, "Antenna Placement on Portable Device."
U.S. Appl. No. 12/351,663, filed Jan. 9, 2009, Chris Li; Steven Chase, "Surface Mount Clip for Routing and Grounding Cables."
U.S. Appl. No. 12/360,089, filed Jan. 26, 2009, Thomas Dimson, Janna Hamaker, Eugene Kalenkovich, Tom Killalea, "Aggregation of Highlights."
U.S. Appl. No. 12/360,744, filed Jan. 27, 2009, Rajiv Kotesh Ghanta; Marcos Frid; Joseph J. Hebenstreit; John T. Kim, "Electronic Device With Haptic Feedback."
U.S. Appl. No. 12/366,941, filed Feb. 6, 2009, Scott Dixon; Eriel Thomas, "Bundled Digital Content."
U.S. Appl. No. 12/414,914, filed Mar. 31, 2009, Amit Agarwal; Zaur Kambarov; Tom Killalea, "Questions on Highlighted Passages."
U.S. Appl. No. 29/331,528, filed Jan. 27, 2009, Chris Green, "User Interface Cluster."
"A Universally Unique IDentifier (UUID) URN Namespace", Jul. 2005, IETF, all pages. Retrieved on Apr. 21, 2010 at http://tools.ietf.org/pdf/rfc4122.pdf.
"Annotation Engine," Berkman Center for Internet & Society at Harvard Law School <http://cyber.law .harvard. edulproj ectsl annotate.html> [Retrieved Jan. 30, 2004].
"Annotator Instructions," Berkman Center for Internet & Society at Harvard Law School <<http://cyber.law.harvard.edu/annotate/instructions.html>>, also found at <<http://cyber.law.harvard.edu/cite/instructions.html>>, [Retrieved Jan. 30, 2004].
"Annotator Wishlist," Berkman Center for Internet & Society at Harvard Law School r <http://cyber.law.harvard.edulcite/annotate.cgi ?action=print&markup ;center=; view=http%3A%2F%2Fcy...> [Retrieved Jan. 30, 2004].
BarnesandNoble.com, "Barnes and Noble Homepage", retrieved on Aug. 2, 2011 http://web.archive.org/web/19981202183957/http://www.barnesandnoble.com/, Dec. 2, 1998.
Beigbeder et al., "An Information Retrieval Model Using the Fuzzy Proximity Degree of Term Occurences", Mar. 2005 ACM Symposium on Applied Computing, pp#1018-pp#1022.
Bellwood, et al., "UDDI Version 2.04 API Specification UDDI Committee Specification, Jul. 19, 2002", Oasis, all pages. Retrieved on Apr. 21, 2010 via Wayback Machine at http://web.archive.org/web/20050314033213/www.oasis-open.org/committees/uddi-spec/doc/tcspecs.htm.

Roscheisen, M., et al., "Beyond Browsing: Shared Comments, SOAPs, Trails, and On-Line Communities," Computer Networks and ISDN Systems 27:739-749, Apr. 1995.
Biskup, J., et al, "Towards a Credential-Based Implementation of Compound Access Control Policies" SACMAT '04, Proceedings of the ninth ACM symposium on Access control models and technologies, Jun. 4, 2004, NY, retrieved from the internet: http://portal.acm.org/citation.cfm?id=990036.990042 (retrieved Nov. 9, 2010.
Bradley, "Plastic Shape Shifter", retreived on May 7, 2009 at <<http://www.reactivereports.com/61/61_3.html>>, Chemistry WebMagazine, Issue No. 61, Dec. 2006, 2 pgs.
Breu, M. et al., "The Medoc Distrubuted Electronic Library: Accounting and Security Aspects", Electronic Publishing, New Models and Opportunities, Proceedings of an ICCC/IFIP Conference, Apr. 14, 1997, pp. 237-249.
Canadian Office Action mailed Apr. 14, 2009 for Canadian Patent Application No. 2594573, a counterpart foreign application of U.S. Appl. No. 11/039,645, 3 pages.
Canadian Office Action mailed Jul. 6, 2012 for Canadian patent application No. 2594573, a counterpart foreign application of U.S. Pat. No. 8,131,647, 5 pages.
Canadian Office Action mailed Apr. 14, 2009 for Canadian Patent Application No. 2594573, a counterpart foreign application of U.S. Appl. No. 11/039,645.
Cafesoft.com, "Security Glossary", dated Oct. 13, 2003, retrieved from the Wayback Machine on Jul. 2, 2009 at <<http://web.archive.org/web/20031013022218/http://cafesoft.com/support/security-glossary.html>>.
Card et al., "3Book: A 3D Electronic Smart Book", AVI'04 May 25-28, 2004, Hallipoli, Italy, ACM 2004, pp#303-pp#307.
Cavanaugh, "EBooks and Accommodations", Teaching Exceptional Children, vol. 35, No. 2, Copyright Nov. and Dec. 2002 CEC, 6 pages.
Chi et al. "eBooks with Indexes that Reorganize Conceptually", CHI2004, Apr. 24-29, 2004, Vienna, Austria ACM 1-58113-703-6/04/0004.
Cleveland, Jr. et al., "Questions and Answers about Biological Effects and Potential Hazards of Radiofrequency Electromagnetic Fields" OET Bulletin 56, Fourth Edition, Aug. 1999, 38 pages.
Cleveland, Jr., et al, "Evaluating Compliance with FCC Guidelines for Human Exposure to Radiofrequency Electromagnetic Fields" OET Bulletin 65, Edition 97-01, Aug. 1997, 84 pages.
Translated copy of the Chinese Office Action mailed May 9, 2008 for Chinese Patent Application No. 200680002606.2, a counterpart foreign application of U.S. Appl. No. 11/039,645.
Translated copy of the Chinese Second Office Action mailed Jun. 5, 2009 for Chinese Patent Application No. 200680002606.2, a counterpart foreign application of U.S. Appl. No. 11/039,645.
Translated copy of the Chinese Third Office Action mailed Nov. 27, 2009 for Chinese Patent Application No. 200680002606.2, a counterpart foreign application of U.S. Appl. No. 11/039,645.
Translated Copy of the Chinese Office Action mailed Feb. 25, 2014 for Chinese patent application No. 200880025056.5 , a counterpart foreign application of U.S. Appl. No. 11/763,374, 13 pages.
Office Action for U.S. Appl. No. 11/763,314, mailed on Mar. 10, 2014, Craig S. Griffin, "Display Dependent Markup Language", 42 pages.
Final Office Action for U.S. Appl. No. 11/693,685, mailed on Mar. 24, 2014, John Lattyak, "Relative Progress and Event Indicators", 26 pages.
Office Action for U.S. Appl. No. 11/763,357, mailed on Mar. 27, 2014, James R. Retzlaff II, "Obtaining and Verifying Search Indices", 14 pages.
The Canadian Office Action mailed Feb. 11, 2015 for Canadian patent application No. 2681755, a counterpart foreign application of U.S. Appl. No. 11/763,349, 4 pages.
The Canadian Office Action mailed Mar. 30, 2015 for Canadian patent application No. 2688002, a counterpart foreign application of U.S. Appl. No. 11/763,358, 5 pages.
The Japanese Office Action mailed Mar. 10, 2015 for Japanese patent application No. 2010-501125, a counterpart foreign application of U.S. Appl. No. 11/763,369, 19 pages.
Office Action for U.S. Appl. No. 12/366,941, mailed on Jan. 6, 2015, Scott Dixon, "Bundled Digital Content", 15 pages.

(56) References Cited

OTHER PUBLICATIONS

Final Office Action for U.S. Appl. No. 11/537,518, mailed on Jan. 9, 2015, John Lattyak, "Acquisition of an Item Based on a Catalog Presentation of Items", 13 pages.
Office Action for U.S. Appl. No. 12/886,877, mailed on Jan. 15, 2015, Gilles Jean Roger Belin, "Cover Display", 45 pages.
Final Office Action for U.S. Appl. No. 11/763,378, mailed on Feb. 5, 2015, John Lattyak, "Transfer of Instructions to a User Device", 21 pages.
Office Action for U.S. Appl. No. 13/959,589, mailed on Feb. 26, 2015, Thomas A. Ryan, "Administrative Tasks in a Media Consumption System", 45 pages.
Office action for U.S. Appl. No. 13/070,328, mailed on Aug. 12, 2014, Rachabathuni, "Last Screen Rendering for Electronic Book Readers", 6 pages.
Office action for U.S. Appl. No. 12/886,877, mailed on Aug. 13, 2014, Belin et al., "Cover Display", 40 pages.
The European Office Action mailed Apr. 7, 2014 for European patent application No. 06718773.2, a counterpart foreign application of U.S. Pat. No. 8,131,647, 7 pages.
Office Action for U.S. Appl. No. 13/722,961, mailed on Apr. 25, 2014, John Lattyak, "Delivery of Items for Consumption by a User Device", 4 pages.
Final Office Action for U.S. Appl. No. 11/763,374, mailed on May 14, 2014, Thomas A. Ryan, "Consumption of Items via a User Device", 21 pages.
Final Office Action for U.S. Appl. No. 12/759,828, mailed on May 2, 2014, James R. Retzlaff II, "Search and Indexing on a User Device", 27 pages.
The Canadian Office Action mailed May 29, 2014 for Canadian patent application No. 2684580, a counterpart foreign application of U.S. Appl. No. 11/763,374, 3 pages.
The Canadian Office Action mailed Aug. 14, 2014 for Canadian patent application No. 2684955, a counterpart foreign application of U.S. Appl. No. 11/693,682, 3 pages.
Translated copy of the Chinese Office Action mailed Jun. 16, 2014 for Chinese patent application No. 200880025056.5, a counterpart foreign application of U.S. Appl. No. 11/763,374, 18 pages.
The Chinese Office Action mailed Jun. 5, 2014 for Chinese patent application No. 201080006308.7, a counterpart foreign application of U.S. Pat. No. 8,378,979, 9 pages.
Office Action for U.S. Appl. No. 13/959,589, mailed on Jun. 2, 2014, Thomas A. Ryan, "Administrative Tasks in a Media Consumption System", 24 pages.
Office action for U.S. Appl. No. 13/284,446, mailed on Jun. 24, 2014, Hansen, "Indicators for Navigating Digital Works", 19 pages.
Office Action for U.S. Appl. No. 12/949,115, mailed on Jun. 4, 2014, Thomas A. Ryan, "Invariant Referencing in Digital Works", 11 pages.
Office action for U.S. Appl. No. 12/943,211, mailed on Jul. 2, 2014, Retzlaff, II et al., "Obtaining and Verifying Search Indices", 9 pages.
The European Office Action mailed Sep. 23, 2014 for European patent application No. 08732668.2, a counterpart foreign application of U.S. Appl. No. 11/763,369, 7 pages.
Malloy, et al. "Google Search", retrieved on Sep. 17, 2014 at <<http://en.wikipedia.org/w/index.php?title=Google_Search&oldid=118323867>>, Wikipedia, the free encyclopedia, Mar. 27, 2007, 6 pages.
Translated Copy of the Japanese Office Action mailed Sep. 2, 2014 for Japanese patent application No. 2011-548210, a counterpart foreign application of U.S. Appl. No. 12/360,744, 4 pages.
Translated copy of the Japanese Office Action mailed Aug. 5, 2014 for Japanese patent application No. 2010-501125, a counterpart foreign application of U.S. Appl. No. 11/763,369, 7 pages.
Office Action for U.S. Appl. No. 13/722,961, mailed on Oct. 10, 2014, John Lattyak, "Delivery of Items for Consumption by a User Device", 8 pages.
Office Action from the U.S. Patent and Trademark Office for U.S. Appl. No. 11/763,378, mailed on Oct. 6, 2014, Lattyak et al., "Transfer of Instructions to a User Device", 16 pgs.

Office Action for U.S. Appl. No. 11/693,682, mailed on Oct. 7, 2014, Siegel et al., "Providing Annotations of a Digital Work", 12 pages.
Office action for U.S. Appl. No. 11/763,314, mailed on Aug. 28, 2014, Griffin et al., "Display Dependent Markup Language", 52 pages.
Office action for U.S. Appl. No. 13/083,445, mailed on Sep. 24, 2014, Siegel et al., "Method and System for Providing Annotations of a Digital Work", 31 pages.
Office action for U.S. Appl. No. 11/537,518, mailed on Sep. 4, 2014, Lattyak, "Acquisition of an Item Based on a Catalog Presentation of Items", 10 pages.
Translated copy of the Chinese Office Action mailed Jan. 6, 2014 for Chinese patent application No. 201080006308.7, a counterpart foreign application of U.S. Pat. No. 8,378,979, 12 pages.
Translated copy of the Chinese Office Action mailed Oct. 10, 2011 for Chinese patent application No. 200880017259.X, a counterpart foreign application of U.S. Appl. No. 11/693,682, 7 pages.
Translated copy of the Chinese Office Action mailed Nov. 5, 2013 for Chinese patent application No. 200880025056.5, a counterpart foreign application of U.S. Appl. No. 11/763,374, 15 pages.
Translated copy of the Chinese Office Action mailed Dec. 13, 2012 for Chinese patent application No. 20078004873.9, a counterpart foreign application of U.S. Pat. No. 7,865,817, 4 pages.
Translated copy of the Chinese Office Action mailed Dec. 14, 2012 for Chinese patent application No. 200880017589.9, a counterpart foreign application of U.S. Appl. No. 11/763,369, 8 pages.
Translated copy of the Chinese Office Aciton mailed Feb. 1, 2013 for Chinese patent application No. 200880025056.5, a counterpart foreign application of U.S. Appl. No. 11/763,374, 19 pages.
Translated copy of the Chinese Office Action mailed May 17, 2012 for Chinese patent application No. 20078004873.9, a counterpart foreign application of U.S. Pat. No. 7,865,817, 5 pages.
Translated copy of the Chinese Office Action mailed May 21, 2012 for Chinese patent application No. 200880017589.9, a counterpart foreign application of U.S. Appl. No. 11/763,369, 9 pages.
Translated Copy of the Chinese Office Action mailed Jun. 28, 2013 for Chinese Patent Application No. 20078004873.9, a counterpart foreign application of U.S. Pat. No. 7,865,817, 4 pages.
Translated copy of the Chinese Office Action mailed Jun. 6, 2013 for Chinese patent application No. 201080006308.7, a counterpart foreign application of U.S. Pat. No. 8,378,979, 13 pages.
Translated copy of the Chinese Office Action mailed Jul. 10, 2013 for Chinese Patent Application No. 20080025056.5, a counterpart foreign application of U.S. Appl. No. 11/763,374, 8 pages.
Translated copy of the Chinese Office Action mailed Jul. 14, 2011 for Japanese patent application No. 20078004873.9, a counterpart foreign application of U.S. Pat. No. 7,865,817, 6 pages.
Translated copy of Chinese Office Action mailed Aug. 25, 2011 for Chinese patent application No. 200880024964.2, a counterpart foreign application of U.S. Appl. No. 11/763,358, 6 pages.
Translated copy of the Chinese Office Action mailed Aug. 3, 2012 for Chinese patent application No. 200880025056.5, a counterpart foreign application of U.S. Appl. No. 11/763,374, 17 pages.
Translated copy of the Chinese Office Action mailed Sep. 24, 2012 for Chinese patent application No. 200880017259.X, a counterpart foreign application of U.S. Appl. No. 11/693,682, 5 pages.
Translated copy of the Chinese Office Action mailed Sep. 26, 2011 for Chinese patent application No. 200880017589.9, a counterpart foreign application of U.S. Appl. No. 11/763,369, 9 pages.
Translated copy of the Chinese Office Action mailed Sep. 30, 2011 for Chinese patent application No. 200880025056.5, a counterpart foreign application of U.S. Appl. No. 11/763,374, 9 pages.
Davison et al. "The Use of eBooks and Interactive Multimedia, as Alternative Forms of Technical Documentation" SIGDOC'05, Sep. 21-23, 2005, Conventry, United Kingdom, Copyright 2005 ACM 1-59593-175-9/5/0009.
Desmoulins et al., "Pattern-Based Annotations on E-books: From Personal to Shared Didactic Content", Proceedings of the IEEE International Workshop on Wireless adn Mobile Techniques in Education, Aug. 2002, 4 pages.
Carter, S., et al., "Digital Graffiti: Public Annotation of Multimedia Content," Proceedings o/the CHI2004, Vienna, Austria, Apr. 24-29, 2004, pp. 1207-1210.

(56) References Cited

OTHER PUBLICATIONS

Elspass, et al., "Portable Haptic Interface with Active Functional Design", In Proceedings SPIE Conference on Smart Structures and Integrated Systems, Newport Beach, California, vol. 3668, Mar. 1999, 926-932.
Extended European Search Report mailed Dec. 22, 2009, issued in corresponding European Patent Application No. EP 06 71 8773.2, filed Jan. 18, 2006.
The European Office Action mailed Dec. 12, 2009 for European Patent Application No. 06718773.2, a counterpart foreign application of U.S. Appl. No. 11/039,645.
The European Office Action mailed Mar. 26, 20010 for European Patent Application No. 06718773.2, a counterpart foreign application of U.S. Appl. No. 11/039,645.
The European Office Action mailed Jun. 10, 2013 for European Patent Application No. 06718773.2, a counterpart foreign application of U.S. Appl. No. 11/693,682, 6 pages.
The European Search report mailed Dec. 22, 2009 for European Patent Application No. 06718773.2, a counterpart foreign application of U.S. Appl. No. 11/039,645.
Office Action from the U.S. Patent and Trademark Office for U.S. Appl. No. 11/763,375, mailed Feb. 23, 2010, 15 pages.
Final Office Action from the U.S. Patent and Trademark Office for U.S. Appl. No. 11/763,378, mailed on Mar. 16, 2010, 16 pgs.
Final Office Action for U.S. Appl. No. 11/763,358, mailed on Apr. 5, 2011, James R. Retzlaff II, "Managing Status of Search Index Generation".
Final Office Action from the U.S. Patent and Trademark Office for U.S. Appl. No. 12/414,914, mailed on Jan. 4, 2012, 16 pgs.
Final Office Action for U.S. Appl. No. 12/360,089, mailed on Jan. 28, 2014, Tom Killalea, "Aggregation of Highlights", 14 pages.
Final Office Action for U.S. Appl. No. 11/763,395, mailed on Oct. 30, 2013, Thomas A. Ryan, "Providing Supplemental Information Based on Hints in a Media Consumption System", 14 pages.
Final Office Action for U.S. Appl. No. 12/414,914, mailed on Feb. 10, 2014, Amit D. Agarwal, "Questions on Highlighted Passages", 40 pages.
Gladney, H. M.: "Access Control for Large Collections", NY, vol. 15, No. 2, Apr. 1, 1997, pp. 154-194.
Goodreads.com, "About goodreads", obtained at www.goodreads.com/about/us on May 29, 2013, 2 pages.
"Haptic History—Machine Haptics (Expansion)" retrieved on May 7, 2009 at <<http://hapticshistory.chc61.uci.cu/haptic/site/pages/Machine-Haptics-Became_5.php.>> from Google's cache, text-only version as webpage appeared on Apr. 16, 2009, 8 pgs.
Henke, H. "Survey on Electronic Book Features", Open eBook Forum, online, Mar. 20, 2002, pp. 1-14, retrieved from the internet: <http://www.openebook.org/doc_library/surveys/IDPF_eBook_Features_2002.pdf> retrieved Nov. 8, 2010.
Jones, et al., "Development of a Tactile Vest", IEEE Computer Society, In the Proceedings of the 12th International Symposium on Haptic Interfaces for Virtual Environment and Teleoperator Systems, Mar. 27-28, 2004, pp. 82-89.
Translated copy of the Japanese Office Action mailed Jan. 14, 2014 for Japanese patent application No. 2011-548210, a counterpart foreign application of U.S. Pat. No. 8,378,979, 4 pages.
Translated copy of the Japanese Office Action mailed Jan. 25, 2011 for Japanese Patent Application No. 2007-552235, a counterpart foreign application of U.S. Appl. No. 11/039,645.
Translated copy of the Japanese Office mailed Oct. 12, 2012 for Japanese patent application No. 2009-544304, a counterpart foreign application of U.S. Pat. No. 7,865,817, 6 pages.
Translated copy of the Japanese Office Action mailed Oct. 25, 2011 for Japanese patent application No. 2007-552235, a counterpart foreign application of U.S. Appl. No. 11/039,645, 3 pages.
Translated copy of the Japanese Office Action mailed Nov. 12, 2013 for Japanese patent application No. 2010-501125, a counterpart foreign application of U.S. Appl. No. 11/763,369, 9 pages.

Translated copy of the Japanese Office Action mailed Dec. 7, 2012 for Japanese patent application No. 2010-509529, a counterpart foreign application of U.S. Appl. No. 11/763,374, 7 pages.
Translated copy of the Japanese Office Action mailed Dec. 7, 2012 for Japanese patent application No. 2010-501124, a counterpart foreign application of U.S. Appl. No. 11/693,682, 6 pages.
Translated copy of the Japanese Office Action mailed Apr. 12, 2013 for Japanese patent application No. 2010-501125, a counterpart foreign application of U.S. Appl. No. 11/763,369, 5 pages.
Translated copy of the Japanese Office Action mailed May 24, 2013 for Japanese Patent Application No. 2010-501124, a counterpart foreign application of U.S. Appl. No. 11/693,682, 7 pages.
Translated copy of the Japanese Office Action mailed May 31, 2013 for Japanese Patent Application No. 2010-509529, a counterpart foreign application of U.S. Appl. No. 11/763,374, 5 pages.
Translated copy of the Japanese Office Action mailed Aug. 23, 2013 for Japanese patent application No. 2009-544304, a counterpart foreign application of U.S. Pat. No. 7,865,817, 4 pages.
Translated copy of the Japanese Office Action mailed Sep. 18, 2012 for Japanese patent application No. 2007-552235, a counterpart foreign application of U.S. Pat. No. 8,131,647, 4 pages.
Homer, et al., "Instant HTML", Programmer's Reference, Wrox Press, 1997, updated Jun. 1998, pp. 76-79.
Leach et al, "A Universally Unique IDentifier (UUID) URN Namespace", Jul. 2005, IETF, retrieved on Apr. 21, 2010 at http://tools.ietf.org/pdf/rfc4122.pdf, 32 pgs.
Leutwyler, "Shape-shifting Polymer Gels", retrieved on May 7, 2009 at <<http://www.scientificamerican.com/article.cfm?id=shape-shifting-polymer-ge&print=true>>, Scientific American, Nov. 9, 2000, 1 pg.
"Mastering to Become a True Manager, Well-selected commands for an efficient event log management, Part 1," Windows Server World, vol. 9, No. 2, pp. 86-96, IDG Japan, Japan, Feb. 1, 2004.
Means, et al., "Evaluating Compliance with FCC Guidelines for Human Exposure to Radiofrequency Electromagnetic Fields", OET Bulletin 65 Edition 97-01, Jun. 2001, 57 pages.
Mercier et al., "Sphere of influence Model in Information retrieval", IEEE May 2005 International Conference on Fuzzy Systems, pp#120-pp#125.
Nakatani, et al., "3D Form Display with Shape Memory Alloy", In Proceedings of 13th International Conference on Artificial Reality and Teleexistence (ICAT), Dec. 2003, pp. 179-184.
Navarro, et al., "Modern Information Retrieval, Chapter 8: Indexing and Searching", Jan. 1, 1999, Modern Information Retrieval, ACM Press, New York, pp. 191-228.
Office Action from the U.S. Patent and Trademark Office for U.S. Appl. No. 11/763,375, mailed on Jan. 19, 2010, 31 pgs.
Office Action from the U.S. Patent and Trademark Office for U.S. Appl. No. 11/763,378, mailed on Oct. 15, 2009, 31 pgs.
Office Action from the U.S. Patent and Trademark Office for U.S. Appl. No. 11/763,375, mailed on Aug. 6, 2010, 17 pgs.
Office action for U.S. Appl. No. 12/943,211, mailed on Feb. 6, 2013, Reztlaff, II et al., "Obtaining and Verifying Search Indices", 9 pages.
Final Office Action for U.S. Appl. No. 11/537,484, mailed on Jan. 24, 2012, Thomas A. Ryan, "Expedited Acquisition of a Digital Item Following a Sample Presentation of the Item", 22 pages.
Final Office Action for U.S. Appl. No. 12/414,914, mailed on Jan. 4, 2012, Agarwal et al., "Questions on Highlighted Passages", 41 pages.
Office action for U.S. Appl. No. 12/360,089, mailed on Oct. 5, 2011, Killalea et al., "Aggregation of Highlights", 17 pages.
Final Office Action for U.S. Appl. No. 11/763,392, mailed on Oct. 14, 2011, Thomas Ryan, "Administrative Tasks in a Media Consumption System", 38 pages.
Office action for U.S. Appl. No. 11/763,374 mailed on Oct. 16, 2012, Ryan et al, "Consumption of Items via a User Device", 13 pages.
Office action for U.S. Appl. No. 11/763,386, mailed on Oct. 16, 2013, Ryan et al., "Handling of Subscription-Related Issues in a Media Consumption System ",18 pages.
Office action for U.S. Appl. No. 11/763,390, mailed on Oct. 24, 2011, Bajaj et al., "Providing User-Supplied Items to a User Device", 11 pages.

(56) References Cited

OTHER PUBLICATIONS

Office action for U.S. Appl. No. 13/083,445, mailed on Oct. 5, 2012, Siegel et al., "Method and System for Providing Annotations of a Digital Work", 29 pages.
Office Action for U.S. Appl. No. 12/943,211, mailed on Oct. 8, 2013, "Obtaining and Verifying Search Indices", 9 pages.
Final Office Action for U.S. Appl. No. 12/759,828, mailed on Nov. 10, 2011, James R. Retzalff II, "Search and Indexing on a User Device", 16 pages.
Office action for U.S. Appl. No. 12/360,089, mailed on Nov. 23, 2012, Killalea et al., "Aggregation of Highlights", 14 pages.
Final Office Action for U.S. Appl. No. 11/537,518, mailed on Nov. 25, 2011, John Lattyak, "Acquisition of an Item Based on a Catalog Presentation of Items," 8 pages.
Non-Final Office Action for U.S. Appl. No. 11/763,386, mailed on Nov. 8, 2011, Thomas Ryan, "Handling of Subscription-Related Issues in a Media Consumption System", 10 pages.
Non-Final Office Action dated Nov. 9, 2011 for U.S. Appl. No. 11/763,395, Thomas Ryan, "Providing Supplemental Information Based on Hints in a Media Consumption System", 10 pages.
Office Action for U.S. Appl. No. 12/759,828, mailed on Dec. 17, 2013, James R. Retzlaff II, "Search and Indexing on a User Device", 25 pages.
Office action for U.S. Appl. No. 11/763,357, mailed on Dec. 21, 2011, Reztlaff et al., "Obtaining and Verifying Search Indices", 14 pages.
Final Office Action for U.S. Appl. No. 11/763,363, mailed on Dec. 23, 2011, James R. Rezlaff II et al., "Search Results Generation and Sorting", 10 pages.
Office Action for U.S. Appl. No. 11/763,374, mailed on Dec. 24, 2013, Thomas A. Ryan, "Consumption of Items via a User Device", 16 pages.
Non-Final Office Action for U.S. Appl. No. 11/763,369, mailed on Dec. 29, 2011, James R. Reztlaff II et al., "Search of Multiple Content Sources on a User Device", 21 pages.
Final Office Action for U.S. Appl. No. 11/693,685, dated Dec. 8, 2011, John Lattyak et al., "Relative Progress and Event Indicators", 23 pages.
Final Office Action for U.S. Appl. No. 11/763,374, mailed on Feb. 13, 2012, Thomas Ryan et al., "Consumption of Items via a User Device", 14 pages.
Office action for U.S. Appl. No. 11/763,392, mailed on Feb. 14, 2013, Ryan et al., "Administrative Tasks in a Media Consumption System", 47 pages.
Office Action for U.S. Appl. No. 11/537,518, mailed on Feb. 14, 2014, John Lattyak, "Acquisition of an Item Based on a Catalog Presentation of Items", 14 pages.
Non-Final Office Action for U.S. Appl. No. 11/763,393, mailed on Feb. 16, 2012, John Lattyak et al., "Incremental Updates of Items", 24 pages.
Office action for U.S. Appl. 13/294,803, mailed on Feb. 21, 2013, "Progress Indication for a Digital Work", 76 pages.
Office action for U.S. Appl. No. 11/763,386, mailed on Feb. 28, 2013, Ryan et al., "Handling of Subscription-Related Issues in a Media Consumption System", 17 pages.
Final; Office Action for U.S. Appl. No. 12/360,089, mailed on Mar. 28, 2012, Tom Killalea et al., "Aggregation of Highlights", 17 pages.
Non-Final Office Action for U.S. Appl. No. 12/366,941, mailed on Mar. 30, 2012, Scott Dixon et al., "Bundled Digital Content", 12 pages.
Office action for U.S. Appl. No. 12/360,089, mailed on Mar. 5, 2013, Killalea et al., "Aggregation of Highlights", 17 pages.
Office action for U.S. Appl. No. 11/763,374, mailed on Apr. 22, 2013, Ryan et al., "Consumption of Items via a User Device", 17 pages.
Office action for U.S. Appl. No. 11/693,682, mailed on Apr. 23, 2012, Siegel et al., "Providing Annotations of a Digital Work", 12 pages.

Final Office Action for U.S. Appl. No. 11/763,386, mailed on Apr. 26, 2012, Thomas Ryan et al., "Handling of Subscription-Related Issues in a Media Consumption System", 14 pages.
Non-Final Office Action for U.S. Appl. No. 11/537,518, mailed on Apr. 28, 2011, John Lattyak, "Acquisition of an Item Based on a Catalog Presentation of Items".
Office action for U.S. Appl. No. 11/763,390, mailed on Apr. 8, 2013, Bajaj et al, "Providing User-Supplied Items to a User Device", 7 pages.
Office action for U.S. Appl. No. 11/763,369, mailed on May 14, 2013, Reztlaff, II et al., "Search of Multiple Content Sources on a User Device", 24 pages.
Office action for U.S. Appl. No. 11/763,395, mailed on May 2, 2013, Ryan et al., "Providing Supplemental Information Based on Hints in a Media Consumption System", 12 pages.
Office action for U.S. Appl. No. 11/763,357, mailed on May 26, 2011, Reztlaff, "Obtaining and Verifying Search Indices".
Non-Final Office Action for U.S. Appl. No. 13/083,445, mailed on May 4, 2012, Hilliard B. Siegel et al., "Method and System for Providing Annotations of a Digital Work", 20 pages.
The Canadian Office Action mailed Jun. 10, 2015 for Canadian patent application No. 2684580, a counterpart foreign application of U.S. Appl. No. 11/763,374, 3 pages.
The Canadian Office Action mailed Jul. 31, 2015 for Canadian patent application No. 2684955, a counterpat foreign application of U.S. Appl. No. 11/693,682, 4 pages.
The Canadian Office Action mailed Sep. 4, 2015 for Canadian patent application No. 2750759, a counterpart foreign application of U.S. Pat. No. 8,378,979, 4 pages.
Translated copy of the Chinese Office Action mailed Mar. 30, 2015 for Chinese patent application No. 200880017589.9, a counterpart foreign application of U.S. Appl. No. 11/763,369, 10 pages.
The European Office Action mailed Dec. 12, 2009 for European Patent Application No. 06718773.2, a counterpart foreign application of U.S. Appl. No. 11/039,645, 9 pages.
Final Office Action for U.S. Appl. No. 12/943,211, mailed on Apr. 24, 2015, James R. Retzlaff II, "Obtaining and Verifying Search Indices", 10 pages.
Office action for U.S. Appl. No. 13/083,445, mailed on May 27, 2015, Siegel et al., "Method and System for Providing Annotations of a Digital Work", 27 pages.
Office Action for U.S. Appl. No. 11/763,378 mailed on Jun. 3, 2015, John Lattyak, "Transfer of Instructions to a User Device", 25 pages.
Final Office Action for U.S. Appl. No. 11/693,682, mailed on Jun. 30, 2015, Hilliard B. Siegel, "Providing Annotations of a Digital Work", 13 pages.
Final Office Action for U.S. Appl. No. 13/959,589, mailed on Jul. 16, 2015, Thomas A. Ryan, "Administrative Tasks in a Media Consumption System", 47 pages.
Office action for U.S. Appl. No. 11/537,518, mailed on Jul. 31, 2015, Lattyak, "Acquisition of an Item Based on a Catalog Presentation of Items", 6 pages.
Office Action for U.S. Appl. No. 14/179,380, mailed on Aug. 3, 2015, Bajaj et al., "Providing User-Supplied Items to a User Device", 13 pages.
Office action for U.S. Appl. No. 12/366,941 mailed on Sep. 15, 2015, Dixon et al., "Bundled Digital Content", 18 pages.
Office action for U.S. Appl. No. 11/963,618 mailed on Sep. 3, 2015, Rykov et al., "Dissemination of Periodical Samples", 16 pages.
Translated Copy of the Korean Office Action mailed Oct. 14, 2015 for Korean Patent Application No. 10-2011-7017613, a counterpart foreign application of U.S. Pat. No. 8,378,979, 6 pages.
Translated Copy of the Korean Office Action mailed Sep. 25, 2015 for Korean patent application No. 10-2009-7024280, a counterpart foreign application of U.S. Appl. No. 11/763,374, 7 pages.
Office action for U.S. Appl. No. 12/943,211 mailed on Oct. 16, 2015, Retzlaff II et al., "Obtaining and Verifying Search Indices", 13 pages.
Office action for U.S. Appl. No. 11/763,314 mailed on Oct. 8, 2015, Griffin et al., "Display Dependent Markup Language", 56 pages.

* cited by examiner

Send marked items to:

Damon's_Device@XYZ.com

Send marked items to one of your contacts:

Albert
Bert
Cindy
Mark
Tim

EXPEDITED ACQUISITION OF A DIGITAL ITEM FOLLOWING A SAMPLE PRESENTATION OF THE ITEM

CROSS REFERENCE TO RELATED APPLICATIONS

This is a continuation application which claims priority to commonly assigned, co-pending U.S. patent application Ser. No. 11/537,484, filed Sep. 29, 2006, which is related to co-pending U.S. application Ser. No. 11/537,518, filed on Sep. 29, 2006, entitled "Acquisition of an Item Based on a Catalog Presentation of Items," naming the inventor of John Lattyak. Application Ser. Nos. 11/537,484 and 11/537,518 are fully incorporated herein by reference.

BACKGROUND

Wide area networks, such as the Internet, provide an increasingly popular mechanism for allowing users to acquire and consume digital content. In a typical scenario, a network-accessible book merchant can facilitate the downloading of an electronic book (e.g., an "eBook") to a local store of a media device (e.g., an eBook reader device). At a later time, the user can retrieve this electronic content for playback from the local store of the media device. Many users find this type of service attractive because it avoids the time-consuming need to visit a brick and mortar establishment to purchase books, music, and so forth. Further, storing digital content in electronic form is more space-efficient than maintaining a library of bulky physical books, CDs, etc.

However, the above-described model is not without its shortcomings. In some cases, a user may find it cumbersome to interact with a remote service to obtain digital content. As appreciated by the present inventor, a service that is perceived as cumbersome may not adequately inspire the same kind of spontaneity in which users sometimes make purchases in a physical establishment. Thus, such a service may negatively affect sales.

For at least the above-identified reasons, there is a need for more satisfactory approaches to electronically providing digital content to users.

SUMMARY

According to one exemplary implementation, an electronic service provides a sample of an item to a user, along with a prompt. The prompt gives the user the opportunity to receive an additional part of the item substantially without further interaction with the user. The streamlined acquisition of the additional part of the media item is enabled by the user's establishment, in advance, of user identification information and payment information.

According to another exemplary implementation, an electronic service provides an electronic catalog to a user. The electronic catalog can include a plurality of descriptions of items. The electronic catalog can also include a plurality of prompts which allow the user to acquire the items described in the electronic catalog. The items in the electronic catalog can be determined by static and/or dynamic considerations.

Additional exemplary implementations and attendant benefits are described in the following.

Figure 1:
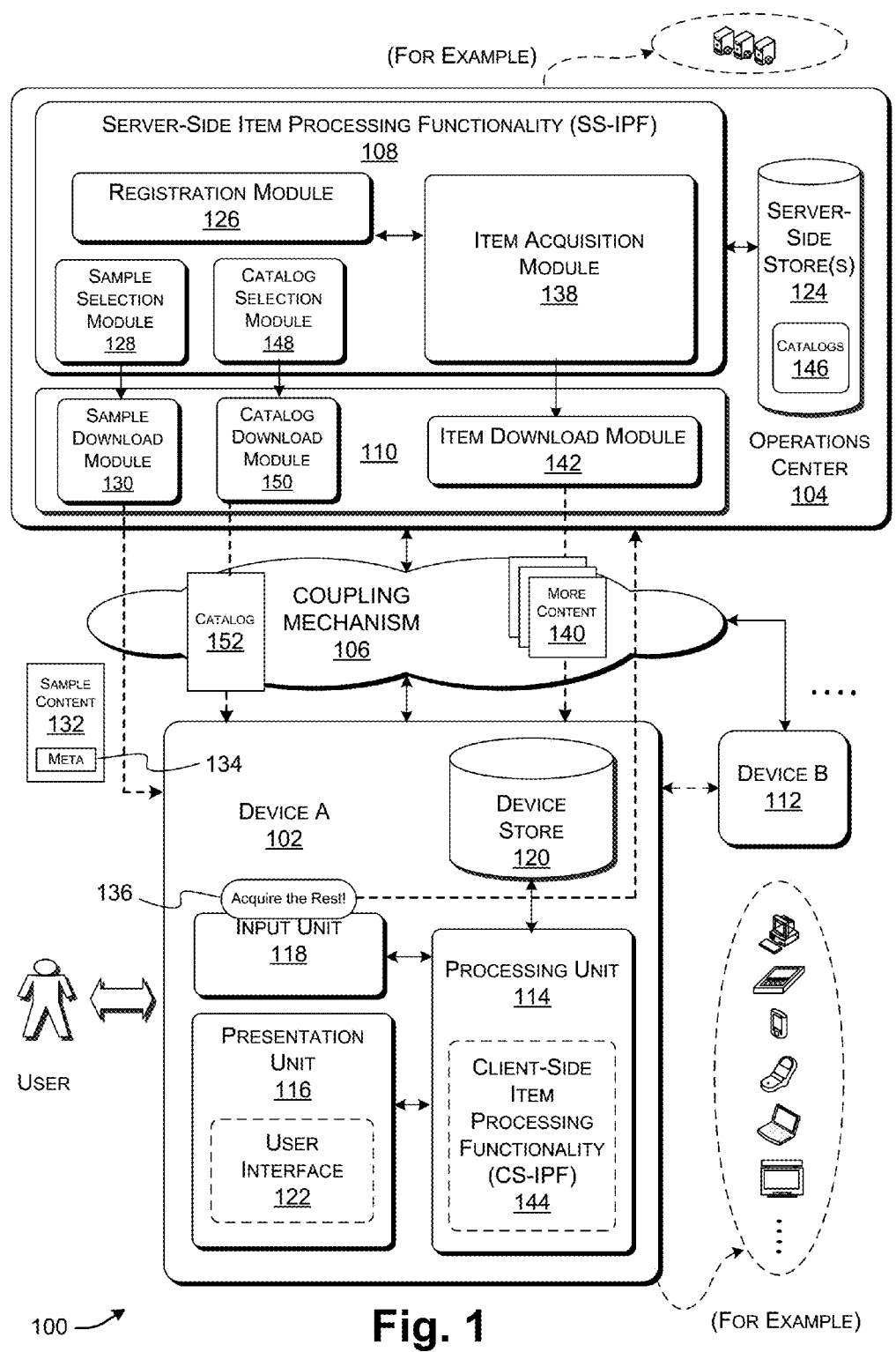
FIG. 1 shows an exemplary system for implementing an electronic service for downloading items. In one implementation, this service provides a sample of an item to a user, along with a prompt. The prompt invites the user to acquire an additional part of the item without substantial further interaction with the service. In another implementation, the service provides a catalog to a user containing plural prompts. The prompts enable the user to acquire items from the catalog.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

According to one exemplary implementation, this disclosure sets forth an electronic service for downloading a sample of an item to a user. The sample contains (or is otherwise associated with) one or more prompts which invite the user to download an additional part of the item. In response to the user's activation of a prompt, the service downloads the additional part substantially without further interaction with the user. For instance, the user need only click on the prompt to receive the additional part of the item. The service can acquire the item in this expedited manner because the user has provided relevant account information in a set-up procedure, prior to making a download request. By virtue of this provision, the user does not need to supply account information at the time of a downloading event. This aspect, in turn, allows the user to make purchases in a more spontaneous and unencumbered manner than heretofore provided. This aspect also allows the user to quickly receive a selected item.

According to another exemplary implementation, this disclosure sets forth an electronic service for downloading an electronic catalog to a user. The catalog can include a plurality of item descriptions, in optional conjunction with a plurality of samples associated with the items. The catalog can also include a plurality of prompts which allow the user to acquire the items described in the catalog. This provision is advantageous because it provides a concise electronic digest from which the user may easily make selections and acquisitions in a spontaneous and unencumbered manner.

The "item" referenced above may comprise any type of content. In the context most often evoked herein, the item comprises a digital media item. The media item can include text content, image content, audio content, video content, hypertext protocol content, code-bearing content, and so on, or any combination of these kinds of content. In addition, or alternatively, the item can include machine-readable code, markup language script, and so forth. Two or more kinds of content can be combined in synchronized fashion using synchronization data. For example, text content can be co-related with audio content using synchronization data.

The term "item" may refer to a specific unit of merchandisable content, such as a book or an album of music. Alternatively, a unit may refer to smaller parts of a merchandisable item, such as a chapter of a book or a song in an album. Alternatively, an item may refer to a larger compilation of component items that are related in any manner. For example, an item may refer to a book series, a subscription to a periodical, a multi-CD box set of music, and so forth.

The term "additional part" may refer to any increment of content that adds to an initially-received sample. In one case, an additional part may furnish the user with an entire merchandisable unit, such as an entire book. According to one variant of this interpretation, the term "additional part" may refer to a remaining portion of the unit. For example, where the entire unit is represented by the symbol Z and the sample is represented by symbol x, the additional part refers to a portion denoted by Z-x. According to another variant of this interpretation, the term "additional part" may refer to a complete copy of the entire unit Z (which includes a portion corresponding to sample x, which has already been supplied to the user). In another case, an additional part may furnish the user with another piece of the entire unit, but not the entire unit. In the latter case, the user can successively activate the prompt to receive the content in piecemeal fashion, e.g., to receive an eBook in chapter-by-chapter fashion.

According to another interpretation, an "additional part" may refer to another part of a more encompassing collection of component items. For example, a "sample" may refer to the complete text of an eBook in a particular series. The electronic service may provide a prompt at the end of the eBook or near the end of the eBook which invites the user to acquire another eBook in the same series, this other eBook constituting an "additional part" of the entire series.

This disclosure includes the following sections. Section A describes an exemplary electronic system for downloading an item to a user. Section B describes exemplary procedures that explain the operation of the electronic system of Section A. In each of these main sections, the disclosure first explains functionality for acquiring an item based on a preliminary presentation of a sample. The disclosure then explains functionality for acquiring an item based on a preliminary presentation of a catalog.

A. Exemplary Systems

As a preliminary matter, the terms logic, module, or functionality generally represent hardware, software, firmware or any combination of these elements, or yet some other kind of implementation. For instance, in the case of a software implementation, the terms logic, module, or functionality represent program code or other instructions that perform specified tasks when executed on a processing device or devices (e.g., CPU or CPUs). The program code can be stored in one or more machine-readable media.

The term machine-readable media or the like refers to any kind of medium for retaining information in any form, including various kinds of storage devices (magnetic, optical, static, etc.). The term machine-readable media also encompasses transitory forms of representing information, including various hardwired and/or wireless links for transmitting the information from one point to another.

A.1. System Overview: Functionality for Acquiring an Item Based on Preliminary Presentation of a Sample FIG. 1 shows an overview of one exemplary system 100 for providing items to a device 102 for consumption at the device 102. According to a first implementation, the system 100 first downloads a sample of the item. The user is then invited to purchase an additional part of the item. When the user responds affirmatively to such a prompt, the system 100 downloads the additional part, allowing the user to consume the entire item or at least another piece of the content.

The system 100 can include an operations center 104 for delivering an item to the exemplary device 102 via a coupling mechanism 106. Beginning with the hardware-related aspects of the system 100, the operations center 104 can be implemented as one or more server computers (e.g., as a "farm" of such computer servers) and associated databases. The architecture of the operations center 104 can be separated into front-end components that interface directly with the device 102 and back-end components that can perform offline analysis. Generally, the components of the operations center 104 can be located at a single site, or distributed over plural sites, and can be maintained by a single entity or plural entities.

In one particular case, the operations center 104 can include a main system for providing a general service for selling goods and services over the Internet, such as books, music, etc. A user may interact with this main system in conventional fashion, e.g., by accessing this system over the Internet using a browser provided by personal computer or like device. This enables the users to review product descriptions, view shopping cart selections, purchase items, and so on. The operations center 104 may also include a separate system for interacting with portable media devices, such as book-reader type devices (also known as eBook readers). For example, the separate system may include technology for interacting with the portable media devices via wireless communication.

For example, FIG. 1 shows that the operations center 104 includes main server-side item processing functionality (SS- IPF) 108. The SS-IPF 108 may maintain a store of items for purchase over the Internet. The operations center 104 may also optionally include a separate system 110 for interacting with special types of devices, such as portable media devices. The separate system 110 can tailor its interaction with the portable media devices to suit their unique characteristics and expectations. The SS-IPF 108 and the separate system 110 can share resources in a manner described below.

In one case, the operations center 104 can forward items to the device 102 via the separate system 110, which acts as an intermediary. The separate system 110 may transform the items into a format that is best suited for receipt by the portable media devices.

There are other ways to download an item to the device 102. In another case, the operations center 104 can forward an item to a separate device 112, and then, the separate device 112 can forward the item to the device 102. For example, the operations center 104 can forward the item via broadband Internet communication to a personal computer. This personal computer can then forward the item to a personal media device via a USB connection or like mechanism. Still other modes of data transfer are possible.

The device 102 represents any kind of electronic unit which can interact with the operations center 104 via the coupling mechanism 106. The explanation provided below with respect to the representative device 102 likewise applies to other devices (not shown), unless otherwise noted.

In one case, the device 102 corresponds to a computer device, such as a personal computer, laptop computer, and so forth. However, as noted, the device 102 may also correspond to a portable type of media device, such as electronic book-reader device, as well as a Personal Digital Assistant (PDA) device, a stylus-type input device, a mobile telephone device, any kind of wearable computing device, a portable media player (e.g., a portable music player), and so on. Still alternatively, the device 102 may correspond to a game console device, a set-top box coupled to a television, and so on.

Generically described, the device 102 can include, among other features, a processing unit 114, a presentation unit 116, an input unit 118, and a device store 120. The processing unit 114 generally corresponds to functionality (e.g., software logic, and/or circuitry, etc.) for processing information. The presentation unit 116 generally corresponds to any mechanism or combination of mechanisms for presenting the processed information. For example, the presentation unit 116 can present a graphical user interface 122 for interacting with the user. The input unit 118 generally corresponds to any mechanism or combination of mechanisms for providing input data to the processing unit 114. And the device store 120 includes any kind or combination of memory for retaining downloaded items and other information.

Figure 8:
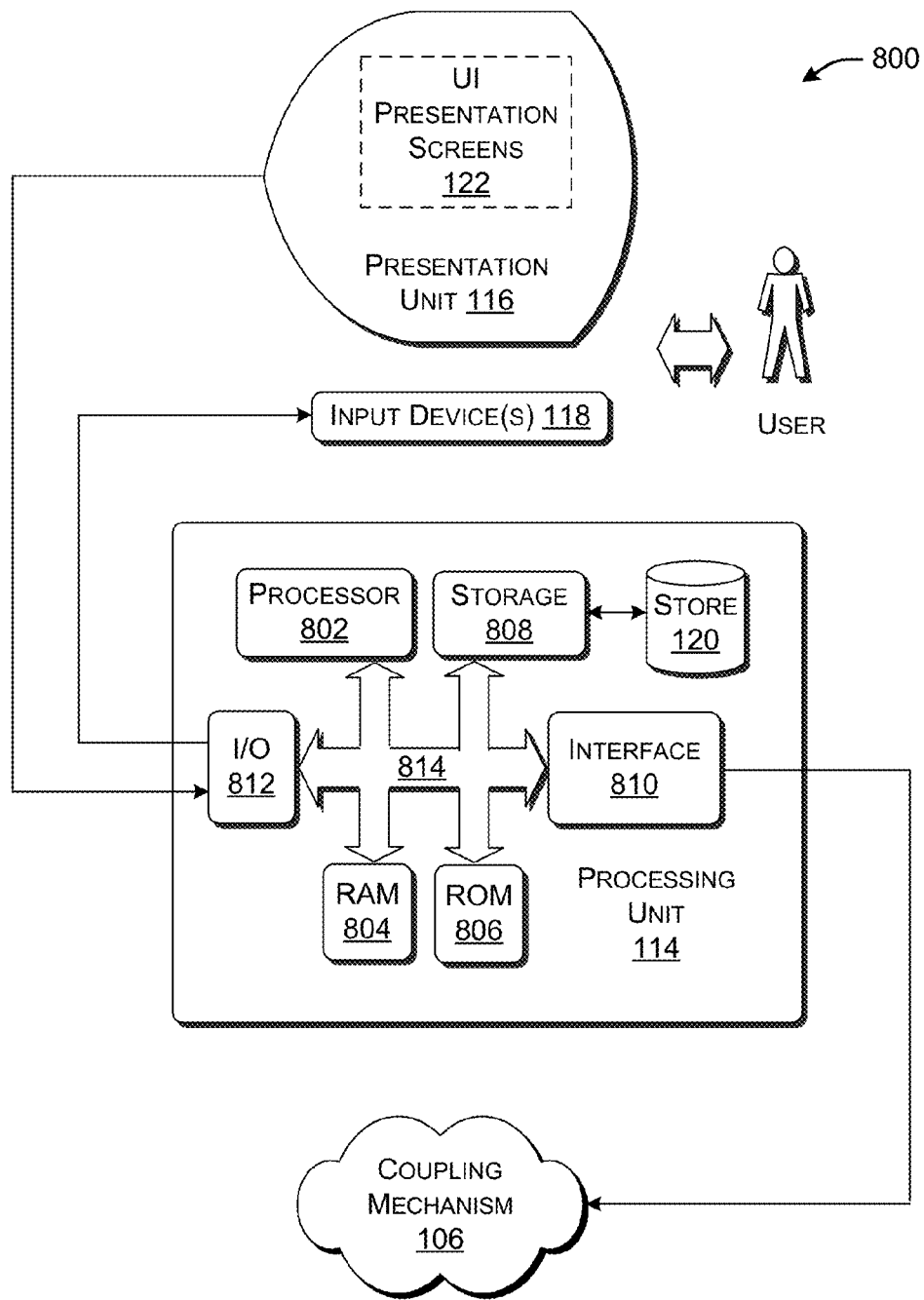
FIG. 8 shows exemplary processing functionality for implementing any aspect of the system of FIG. 1.
Figure 9:
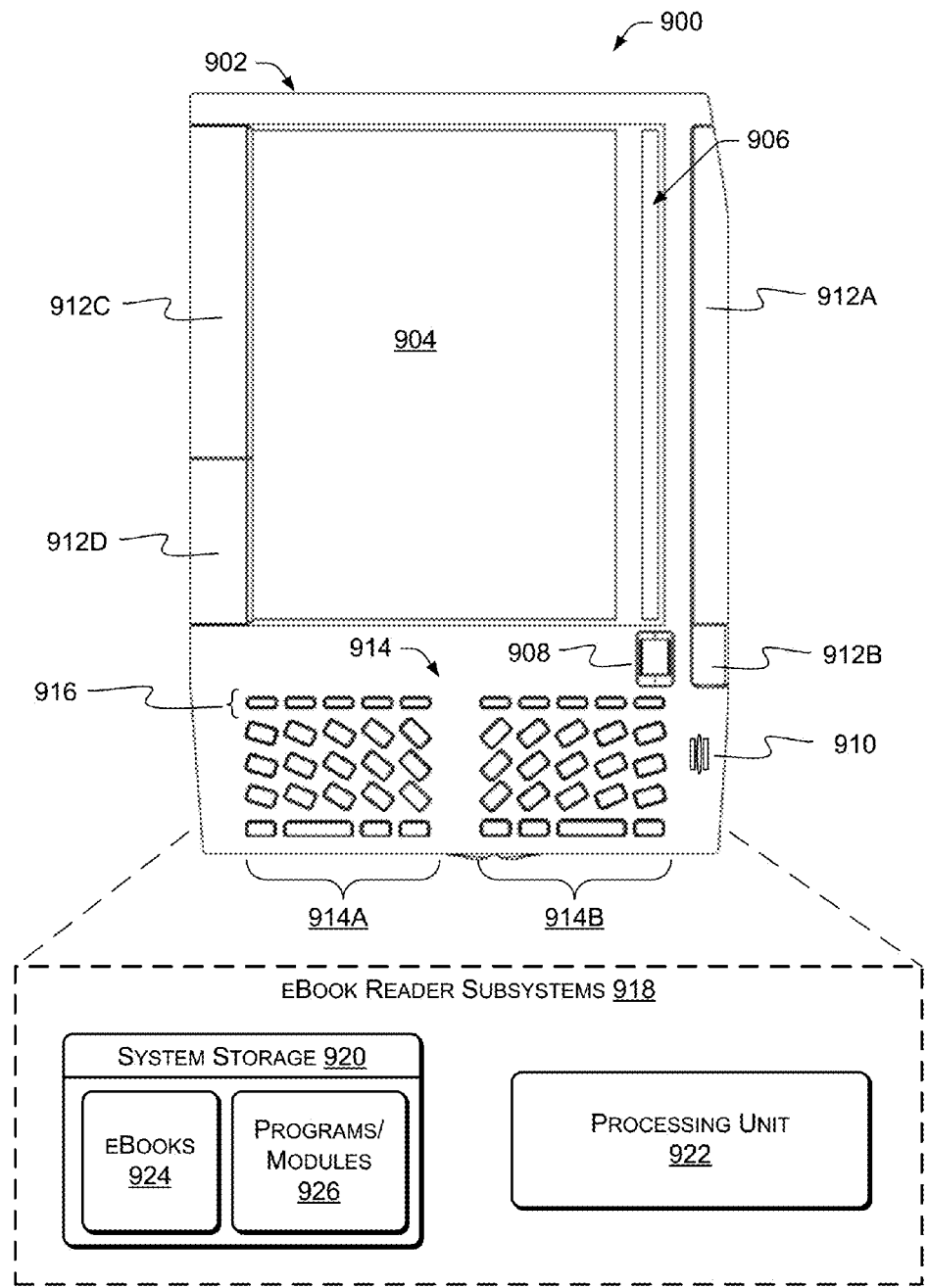
FIG. 9 shows an exemplary eBook reader that can be used to interact with the system of FIG. 1.

FIG. 8, to be discussed below in turn, provides additional information regarding generic processing functionality that can be used to implement various aspects of the operations center 104, as well as the device 102. FIG. 9, to also be discussed in turn, provides additional information regarding one exemplary and non-limiting implementation of the device 102 as an electronic book-reader device.

The coupling mechanism 106 can correspond to any kind of communication conduit or combination of communication conduits. In the case most commonly evoked in this disclosure, the coupling mechanism 106 corresponds to a wide area network, such as the Internet. However, the coupling mechanism 106 can alternatively, or in addition, comprise other kinds of communication conduits, such as an intranet, point-to-point coupling arrangement, and so forth. In any case, the coupling mechanism 106 can include any combination of hardwired links, wireless links, routers, repeaters, gateways, name servers, and so forth (not shown), governed by any protocol or combination of protocols. In particular, as stated above, the system 100 can rely on wireless communication technology to interact with portable media devices, such as electronic book-reader devices.

Having provided an overview of hardware-related features of the system 100, the functional aspects of the system 100 are now set forth in greater detail, starting with the operations center 104.

The operations center can include one or more server-side stores 124 (referred to in the singular below for convenience). This store 124 can store item records that describes various items that users can purchase (or otherwise acquire), such as books, music, and other products, including "hard goods," such as clothing articles, electronic goods, etc. This store 124 can also store digital copies of media items that can be downloaded to users in lieu of, or in addition to, the physical shipment of items to users. For instance, the store 124 can retain electronic copies of books (e.g., eBooks), digital music files, image content (e.g., photographs, etc.), videos, and so on. The store 124 can also provide other types of content, such as software, markup language script, raw data (e.g., financial data, etc.), and so on. More generally stated, the operations center 104 can maintain any kind of data that can be transferred to the device 102, of any nature, for use in an application. In one case, the store 124 can represent a repository of information as maintained by a single entity. In another case, the store 124 can represent a distributed repository of information maintained by plural entities, potentially using peer-to-peer (P2P) technology.

The operations center 104 can also include a registration module 126. The registration module 126 allows the user to provide set-up information to enable the user to interact with the operations center 104. By way of example and not limitation, the set-up information may allow the user to input: a) user identification information that identifies the user; b) payment information that identifies how the user will pay for item selections (e.g., credit card information and the like, billing address information, etc.); c) shipment information that identifies where physical items selected by the user are to be shipped; d) device information that identifies the device or devices that the user will use to interact with the operations center 104 (such as the network addresses of these devices and other device-identifying information), and so on. The set-up information can also optionally allow the user to expressly authorize a provision, to be described, which allows the user to acquire an additional part of a media item in expedited fashion.

The set-up information entered via the registration module 126 can govern both the user's online communication with the operations center 104 via a personal computer, as well as the user's interaction with the separate system 110 via a portable media device through wireless communication. In an alternative implementation, separate set-up protocols can be used to govern access to the main SS-IPF 108 and the separate system 110.

The operations center 104 further includes a sample selection module 128. The purpose of the sample selection module 128 is to forward a sample of an item to the user at the device 102. As the name suggests, in one exemplary application, a sample of an item comprises part of the item, but not the entire item. For example, the sample may comprise any part of an eBook, such as one or more chapters, one or more pages, one or more paragraphs, and so on. The partitioning of an eBook can also depend on the nature of the information being downloaded. For example, in a book of recipes, a sample can comprise one or more recipes. In a book of poems, the sample may comprise one or more poems. In a periodical publication or a book series, the sample may comprise a complete issue or eBook in the series, and so on. As to audio content, the sample may comprise one or more songs from a compilation of songs, one or more snippets from a single song, and so on. No limitation is placed on how the operations center 104 may choose to partition items into downloadable samples. In still another implementation, the user may be given the option, with some possible restrictions, as to what part of an item should be downloaded to the device 102 as a sample. Additional details regarding the sample selection process are provided in a later subsection.

A sample download module 130 is employed to forward a sample 132 to the device 102 via the coupling mechanism 106. The sample download module 132 can format the sample in an appropriate manner to accommodate any unique characteristics of the receiving device 102. For example, the sample downloading module 130 can apply particular formatting to the sample 132 so that it can be read by a book-reader device or other kind of special portable media device. The sample download module 130 can also optionally format the sample 132 to accommodate a special mode of transmission to the device 134, such as a wireless mode of transmission.

The sample 132 itself can include a content portion that corresponds to the text, image information, and/or program content that the user wishes to acquire. The sample 132 may optionally also include metadata 134. The metadata provides information which is supplemental to the content of the item. For instance, the metadata may include keywords or other information which enable the device 102 to search within the sample 132 or perform other functions. In one implementation, the sample 132 can be protected using any kind or combination of access restriction provisions, such as a digital rights management (DRM) mechanism. In another implementation, no access restriction provisions may be applied to the sample 132.

Upon receipt, the device 102 can display or otherwise present the sample. The sample may be accompanied by a prompt 136 which invites the user to acquire an additional part of the item. For instance, the user may activate this prompt to purchase (or otherwise acquire) the entire item. As explained above, the additional part may correspond to a remaining portion of the item (excluding the already-downloaded sample) or a complete version of the entire item (including the already-downloaded sample). Or the user may activate this prompt to purchase (or otherwise acquire) another piece of the item, but not the entire item. Or the user may activate an "Acquire Another" type of prompt to acquire another component item in a larger collection of component items, where such larger collection is related based on any criterion (or criteria). Later sections describe this prompting behavior in greater detail. By way of overview, the prompt 136 may represent information that is displayed on the user interface 122 of the device 102. The prompt 136 may be associated with the sample itself. For example, the prompt may be added to the end of the sample or at another juncture or junctures within the sample, so that when the user reaches the end of the sample (e.g., by scrolling down) or some other juncture in the sample, the user is presented with the prompt 136. Alternatively, or in addition, the prompt 136 can be associated with parts of a user interface presentation which are separate from the sample itself. For example, the prompt 136 can be provided in a toolbar that is located at the periphery of a window in which the sample appears. In this case, the prompt 136 does not move when the sample is scrolled.

Alternatively, or in addition, the prompt 136 may represent a physical input mechanism, such as an "Acquire the Rest" button that is located on the housing of the device 102 or elsewhere. Alternatively, or in addition, the prompt may be an audible prompt, and the system 100 can register the user's response to the prompt 136 using a microphone and voice recognition technology. Still further implementations are possible.

An item acquisition module 138 receives the users request to purchase (or otherwise acquire) an item, and, in response, downloads the item to the user, or otherwise provides the item to the user. In the specific context of the protocol being explained here, the item acquisition module 138 can respond to the user's activation of the "Acquire the Rest" prompt 136, thereby forwarding an additional part 140 of the item to the device 102. As described above, an "additional part" 140 of the item may correspond to the entire item itself (e.g., an entire book or album of songs), or just another piece of the entire content, or another component item in a larger collection of component items. In an alternative implementation, the system 100 can be configured at the option of one or more users so that the item acquisition module 138 forwards the additional part 140 to a different device than the device which received the sample 132.

In one implementation, the additional part 140 can be protected using any kind or combination of access restriction provisions, such as a digital rights management (DRM) mechanism. In one particular approach, for instance, the sample download module 130 can provide a sample 132 that has no DRM protection, and the item download module 142 can download the additional part 140 which does contain DRM protection. In an alternative implementation, the operations center 104 can apply no access restriction provisions to either the sample 132 or the additional part 140.

To perform the above-described role, the item acquisition module 138 can access user account information established by the registration module 126. This enables the item acquisition module 138 to download the additional part 140 without any additional interactions with the user beyond the user activating the "Acquire the Rest" prompt 136. In other implementations, the item acquisition module 138 can download the additional part 140 without substantial user interaction, meaning that item acquisition module 138 may still provide for some minimal interaction with the user. For example, the item acquisition module 138 can prompt the user with a Yes/No type of prompt to make sure that the user really intends to purchase an entire item. This prompt can additionally show set-up information maintained by the registration module 126, which allows the user to confirm that the user information, payment information, etc. are correct and up-to-date.

The expedited nature of the item acquisition module 138 in downloading the additional part 140 is desirable because it provides an intuitive, efficient, and straightforward mechanism that allows the user to acquire an additional item. This provision is also beneficial from the standpoint of the merchant (or merchants) which administer the operations center 104. This is because, by virtue of the streamlined nature of the transaction, the user is more likely to make spontaneous purchases.

An item download module 142 sends the additional part 140 of the item to the device 102. Like the sample download module 130, the item download module 142 can perform this task by formatting the additional part 140 for transmission over a selected communication channel (e.g., a wireless communication channel) for receipt by a particular type of device (such as book-reader type of device). The item download module 140 can immediately or substantially immediately send the additional part 140 when the user activates the "Acquire the Rest" prompt 136. Alternatively, the item download module 142 can send the additional part 140 to the user in deferred fashion (e.g., when the bandwidth over a network is not expected to be high), and/or in staggered or piecemeal fashion. The item download module 142 can share one or more processing resources with the sample download module 130; indeed, in one case, these two modules (130, 142) can represent the same module.

Upon receipt, the device 102 can store the additional part 140 in its local store 120. The user can retrieve and consume the item from the local store 120 at his or her leisure in one session or plural sessions. Alternatively, the device 102 can consume the item in streaming or piecemeal fashion as it is being sent down by the operations center 104, and so on. In any event, the item can optionally include appropriate DRM protection to prevent unauthorized access to the content.

Alternatively, the operations center 104 can send the entire item to the user device 102 prior to the user device 102 requesting it. For example, the operations center 104 can send the entire item to the device 102 at the same time that the sample 132 is downloaded to the device 102. In this case, all of the content except the sample can be encrypted, preventing a user from consuming it. Instead of a downloading operation, when the user activates the prompt 136, the system 100 can authorize access to the already downloaded content, e.g., by giving the user appropriate keys to decrypt the content.

Still further variations of the download process can be implemented.

Finally, the device 102 can include client-side item processing functionality (CS-IPF) 144. The CS-IPF 144 performs any complementary functions required to interact with the above-described modules of the operations center 104. Also, as a general principle, one or more of the features described above as being performed by the operations center 104 can alternatively be performed locally by the device 102, or by a combination of the operations center 104 and the device 102.

A.2. Exemplary Mechanisms for Setting Up the Service

Figure 2:
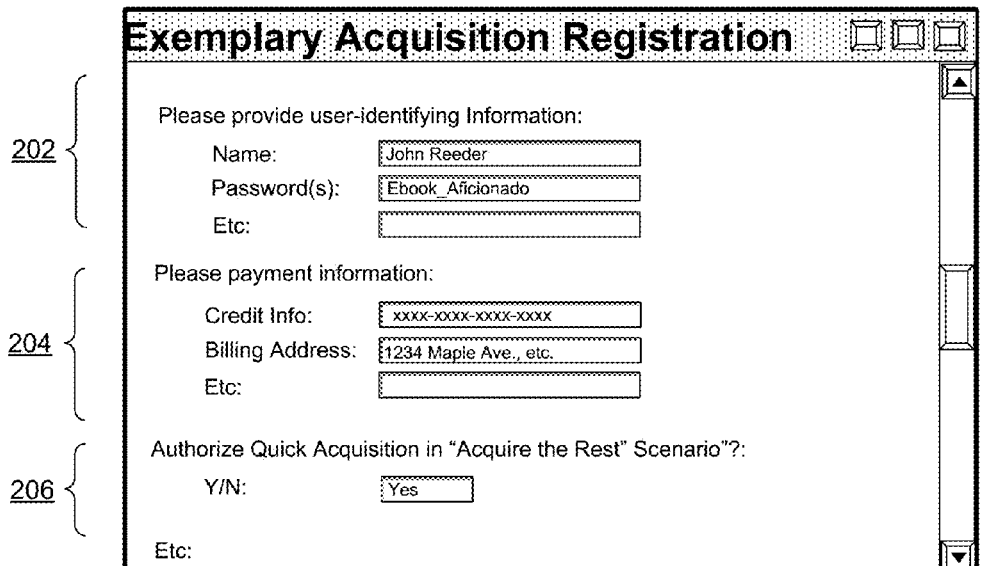
FIG. 2 shows an exemplary user interface (UI) presentation for entering user information and payment information, enabling a user to acquire an item without substantial further interaction with the service.

FIG. 2 shows an exemplary page 200 that can be provided to a user by the registration module 126. As described above, the registration module 126 can supply this page 200 to the user while the user is connected to the operations center 104 using a personal computer or like device. The selections made via this page 200 can also govern the user's interaction with another device, such as a portable media device (e.g., an electronic book-reader device). Alternatively, or in addition, the registration module 126 can supply the page 200 or some variation thereof to a portable media device for interaction with the user via this device.

The page 200 itself includes a first input section 202 which allows the user to provide various information items which identify the user. The page 200 includes a second input section 204 which allows the user to input various information items which identify how the user will pay for items which he or she purchases. The page can also include other sections (not shown), which allow the user to input various information items which identify the device(s) which the user will use to interact with the operations center 104, and so on.

Another acquisition page (not shown) can optionally allow the user to identify one or more social contacts (friends, family members, etc.) or other users (or devices) with whom the user wishes to interact on a regular basis. This registration task can be performed by allowing the user to identify the personal addresses of these users (e.g., by providing the personal Email addresses associated with these users), or by allowing the user to identify the addresses of devices associated with these users, and so forth.

Of particular note in the context of the present discussion is a confirmation section 206. This section optionally allows the user to confirm whether the user wishes to enable the above-described rapid acquisition of the item in response to the user's activation of the "Acquire the Rest" prompt 136. The user may wish to disable this capability for any number of reasons, for example, to discourage children from easily making purchases, and so on.

A.3. Exemplary Mechanisms for Receiving and Interacting with Samples

Figure 3A:
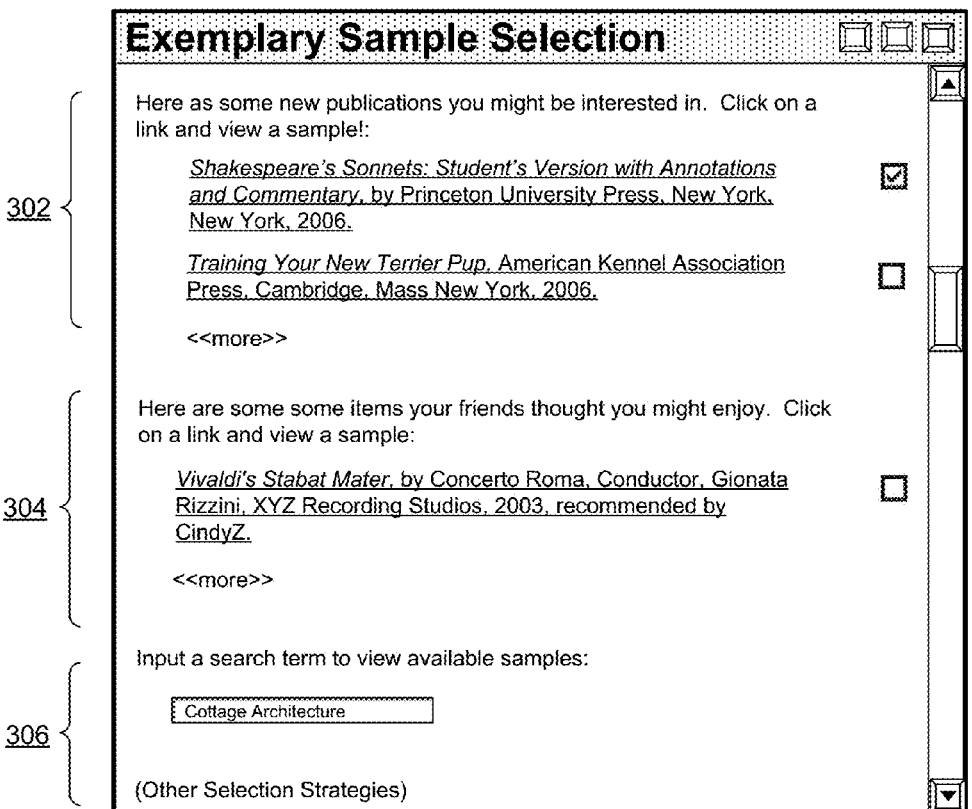
FIG. 3A shows an exemplary UI presentation for acquiring a sample using different sample-acquisition techniques.

FIG. 3A shows a sample selection page 300 that is optionally enabled by the sample selection module 128 in possible combination with code stored by the client-side item processing functionality (CS-IPF) 144. This page 300 shows a compilation of different input mechanisms for selecting one or more samples. This page 300 is presented by way of exemplary exposition and not limitation. Any implementation of this page 300 can adopt any one of the illustrated input mechanisms, or some variant of one or more of these mechanisms, In a first sample-related section 302, the system 100 can invite the user to review samples of items recommended by the operations center 104 or some other entity. For example, a merchant may invite the user to select one or more recently published or released items. Using known recommendation technology, a merchant can alternatively, or in addition, invite the user to select one or more samples for items that are related to prior selections made the user.

The entity making recommendations can represent some other actor other than a merchant who sells items. For instance, a book club or other organization can compile recommendations and forward the recommendations to the user. The user may optionally have an established (and authorized) relationship with such book club or other organization. Still alternatively, in a second sample-related section 304, the system 100 can notify the user that a social contact, such as a friend or family member, has forwarded sample selections for the user's consideration.

In the first and second selections (302, 304), the sample selection module 128 can provide hypertext links or the like. The user can activate these links to receive the actual corresponding samples. The device 102 can retrieve these samples either from the operations center 104 or from the local store 120 (providing that the actual samples have already been downloaded to the device 102). Alternatively, instead of sending an invitation to receive a sample, the sample selection module 128 can automatically and directly display the sample itself.

The third section 306 provides yet another way to receive samples. In this section, the user can enter a search term. In the case shown in FIG. 3A, the user has entered the term "Cottage Architecture," indicating a possible desire to review a sample of a book devoted to small house architecture. In response to this selection, the sample selection module 128 and/or the CS-IPF 144 determine whether there is a sample that satisfies the search term. In performing this search, the system 100 may examine samples that are maintained by the operations center 104, and/or samples that have already been downloaded to the local store 120 and are searchable via metadata that accompanies these samples. In one particular implementation, the system 100 responds to an entered search term by showing at least one item detail page which satisfies the user's search selection. If so enabled, the item detail page can include, among other descriptive information pertaining to the item, an invitation for the user to receive a sample corresponding to the item.

Figure 3B:
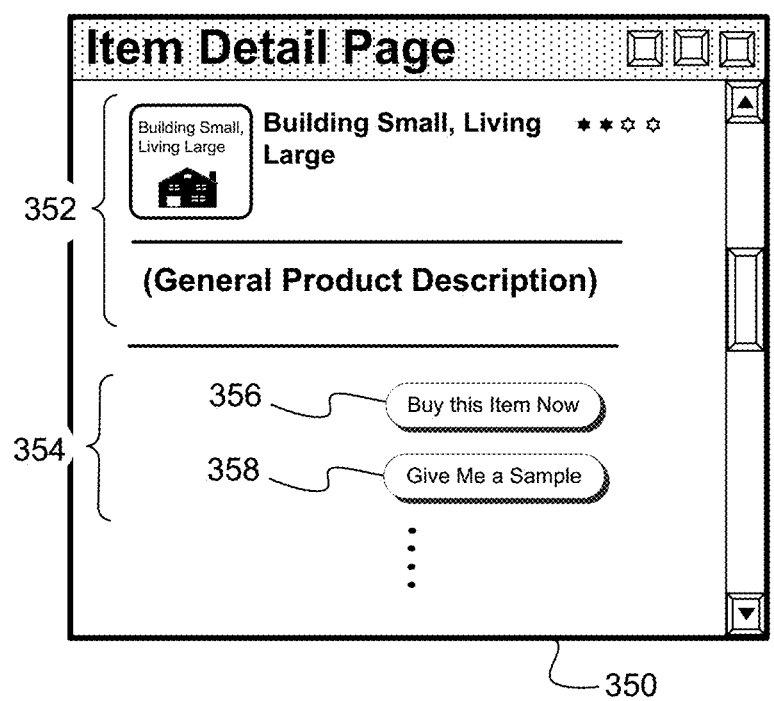
FIG. 3B shows another exemplary UI presentation for acquiring a sample or an entire item in the context of an item detail page.

FIG. 3B shows an item detail page 350 that invites a recipient user to receive a sample. In one implementation, the operations center 104 provides the item detail page 350 in response to the user's interaction with the third section 306 shown in FIG. 3A. In another implementation, the operations center 104 provides the item detail page 350 in response to any other kind of search performed by the user. For instance, the user can enter relevant key terms into a general search engine to receive a list of one or more matching items selected from a catalog of items. The user can activate the item detail page 350 by clicking on an appropriate entry in the list. Or the user can access the item detail page 350 by navigating down through a hierarchical categorization of items.

The item detail page 350 itself can include a portion 352 that provides a pictorial and/or textual description of the item, various user comments concerning the item, and so on. The item detail page 350 can also provide one or more prompts 354 that allow the user to take further action regarding the item. A first prompt 356 ("Buy this Item Now" or the like) allows the user to purchase the item without necessarily receiving an advance sample of the item. A second prompt 358 ("Give Me a Sample" or the like) allows the user to receive a sample of the item. The user may activate the second prompt 358 to receive further information regarding the item, e.g., so as to enable the user to make a decision regarding whether he or she should purchase the item. The item detail page 350 can include yet additional types of prompts (not shown).

As a general provision, the sample selection process can employ push technology (in which the sample is pushed down to the device 102 without the user expressly requesting this content), pull technology (in which the sample is pulled down to the device 102 when the user makes an express request for this content, or a combination of push and pull technology.

Figure 4A:
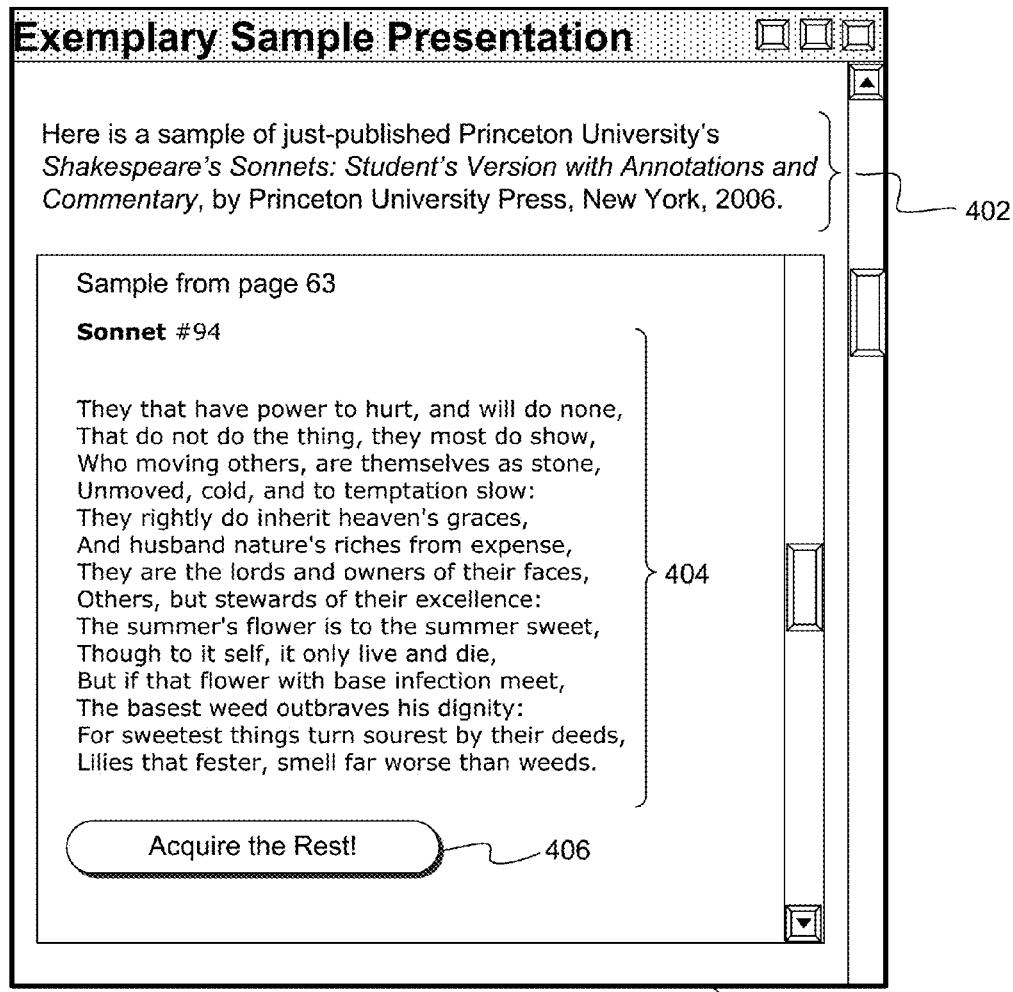
FIG. 4A shows one exemplary UI presentation for presenting a sample. The sample contains a prompt, namely, an exemplary "Acquire the Rest" prompt, which invites the user to acquire an additional part of the item.

FIG. 4A shows a sample presentation page 400. As the name suggests, this page 400 presents a sample of an item to the user. This sample can be sent to the user in any of the ways described above with reference to FIGS. 3A and 3B. In another case, the sample can be downloaded to the device 102 without the user expressly requesting this content.

A sample identifies a part of a more encompassing body of content. In the illustrative case of FIG. 4A, the sample refers to a poem in a book of poems. The sample presentation can optionally include information 402 that identifies the book of poems, as well as a sample poem 404 from the book.

The sample can be selected based on any number of factors. In one case, the sample selection module 128 can provide predetermined parts of the item, such as the title, table of contents, index, and so on. The selection module 128 can also provide a part of the main body of the item, such as one or more first chapters of the item, one or more first pages of the item, a predetermined percentage of the item, and so on. In another case, the sample selection module 128 can randomly select parts of the item to provide to the user. In another case, the sample selection module 128 can allow the user to control, to some extent, what parts of the item are provided as a sample.

In any of the above-identified sample selection options, the sample selection module 128 can apply appropriate safeguards to prevent the user from acquiring too much of the item (e.g., all of the item) and/or critical parts of the sample without purchasing the item. For example, the sample selection module 128 can prevent certain parts of the item from being sent in any circumstance, thereby ensuring that the user cannot retrieve successive samples to reconstruct the entire item. A co-pending application that provides other techniques which can be used to govern the selection of samples and the user's interaction with the samples is: U.S. Ser. No. 11/392, 245 (the 245' Application), filed on Mar. 29, 2006, entitled, "Automated Monitoring and Control of Access to Content from a Source," naming the inventors of Brian R. Williams, et al. The 245' Application is incorporated herein by reference in its entirety. Any of the techniques described in the 245' Application can be used by the sample selection module 128 to govern the dissemination of samples to users.

Further, the sample selection module 128 can apply conventional DRM mechanisms or other known mechanisms to prevent users from copying, printing, or transferring sample content in an unauthorized manner.

Of particular interest in FIG. 4A is the "Acquire the Rest" command button prompt 406. This prompt 406 can be activated by the user in order to retrieve the rest of the item (e.g., the entire book of poems), or at least an additional part of the item (e.g., another poem or collection of poems). In one case, the prompt 406 can be incorporated into the sample presentation itself, e.g., so that it scrolls along with the sample content 404. In the case shown in FIG. 4A, the prompt 406 is located at the end of the sample 404. But the prompt 406 can also be displayed at other junctures in the sample 404, such as at the beginning of the sample 404, at the top or bottom of each page of the sample 404 (in those cases in which the sample spans multiple pages), in the middle of the sample 404, and so forth. Generally, a single sample can include a single prompt or multiple prompts dispersed throughout the sample. In other cases, the page 400 can present the prompt 406 as part of the user interface that is not directly associated with the sample content 404, such as in a peripheral toolbar portion (not shown). The size, shape, labeling, placement and other characteristics of the prompt 406 can be varied in a myriad of different ways.

Figure 4B:
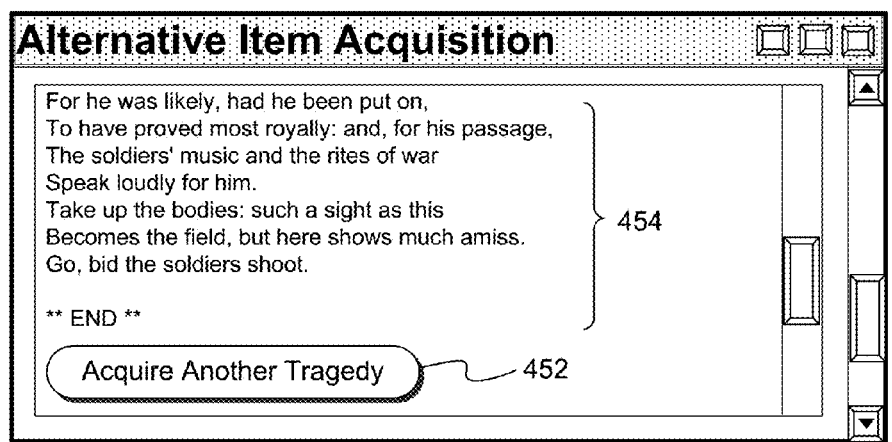
FIG. 4B shows another exemplary UI presentation for acquiring an item. In this case, the UI presentation provides a prompt at the end of one component item, inviting the user to acquire another component item.

FIG. 4B shows another presentation page 450 that includes a prompt 452 to acquire an additional part of an item. Here, however, the term "item" refers to a collection of component items. The "sample" may correspond to one of these component items, and an "additional part" may refer to another component item in the collection. Thus, whereas the prompt of FIG. 4A can be characterized as an "Acquire the Rest" type of prompt, the prompt of FIG. 4B is more aptly characterized as an "Acquire Another" or "Acquire Next" type of prompt.

In the illustrative and non-limiting case of FIG. 4B, the user has already downloaded a complete eBook play for Shakespeare's Hamlet, this entire play constituting the "sample." The presentation page 450 shows the last few lines 454 of the play Hamlet. At this juncture, the system 100 can display the prompt 452. The prompt 452 invites the user to acquire another of Shakespeare's tragedies, such as Macbeth, the entire play of Macbeth constituting the "additional part." When the user clicks on this prompt 452, she may quickly receive the entire eBook of Macbeth. The text of Macbeth, in turn, may include a terminal portion which contains yet another invitation to purchase another of Shakespeare's tragedies. In this manner, the system 100 can link a series of eBooks together, allowing the user to acquire one after another. FIG. 4B shows the presentation of a single prompt 452, but other implementations can display plural prompts, e.g., inviting the user to select among plural tragedies to purchase next.

The component items in a collection of such items can be related in any way. Without limitation, the following list sets forth exemplary ways that component items may be linked together:

One collection of component items can pertain to eBooks, music or other component items that are published by a particular publisher (such as Random House) or offered by a particular merchant.

Another collection of component items can pertain to eBooks, music or other component items that feature a particular artist.

Another collection of component items can pertain to eBooks, music or other component items that are published in a particular timeframe (such as a collection of the most recent books being offered by a particular eBook merchant, etc.).

Another collection of component items can pertain to eBooks, music or other component items that belong to an identified theme, such a philosophy, romance novels, cooking, etc.

Another collection of component items can pertain to eBooks, music or other component items that are identified by any kind of entity serving in a critical or listing-making role. For instance, a group of component items can be created based on the New York Times' best seller list.

Another collection of component items can pertain to eBooks, music or other component items that belong to a defined series, such as books within a book series, periodicals of any nature, and so on.

Another collection of component items can pertain to eBooks, music or other component items that are identified by a particular user. A user may create such a list of items for general publication without restriction. Or the user may create such a list for dissemination to a predefined group, such as to friends. For example, in one case, the user may create a "wish list" for his or her own consumption. In another case, the user may send the list to one or more other users.

Another collection of component items can pertain to eBooks, music or other component items that are related to a user's previous purchases or other item selections, or based on the user's characteristics, or based on any other relevance-based considerations.

Another collection of component items can pertain to eBooks, music or other component items that are identified by any kind of club, such as an eBook club. The club can create lists of component items based on different types of promotional schemes.

Another collection of component items can pertain to eBooks, music or other component items that are grouped together based on marketing-related considerations. For example, an advertiser can pay money to ensure (or at least more readily ensure) that the prompt 452 features one of the items it wishes to promote. In this sense, the "Acquire Another" prompt 452 represents advertising space. Advertisers can competitively bid on this space in any number of ways.

Another collection of component items can pertain to eBooks, music or other component items that has no overarching rules governing membership in the collection. For example, the system 100 can employ an engine that selects a next component item based on the characteristics of a current component item that the user is consuming. For example, assume that the user is viewing a cooking eBook relating to Italian cooking, called "Great Tuscany Deserts". Based on the keywords in this title, the system can present a subsequent component item that is related to cooking, deserts, or perhaps the Tuscany region of Italy in general (and not necessarily relating to cooking). Alternatively, or in addition, the system 100 can select a subsequent item based on empirical data regarding the prior selections made by a population of users, e.g., by noting that most users who purchased the book "Great Tuscany Deserts" also purchased the book "Mediterranean Treats." In this manner, note that the user may be presented with a meandering selection of items that possibly reflects no overarching theme.

Still other bases can be used to create groups of items. Further, the system 100 can rely on any combination of the above factors in determining what type of component items to present to a user.

In more general terms, note that a first class of item groupings may pertain to collections that are defined in advance. That is, the membership of these collections may remain fixed. A second class of item groupings may pertain to collections having memberships that can dynamically change based on one or more triggering events. For example, a group of component items that corresponds to the New York Times best seller list can be updated each time that list changes.

Figure 4C:
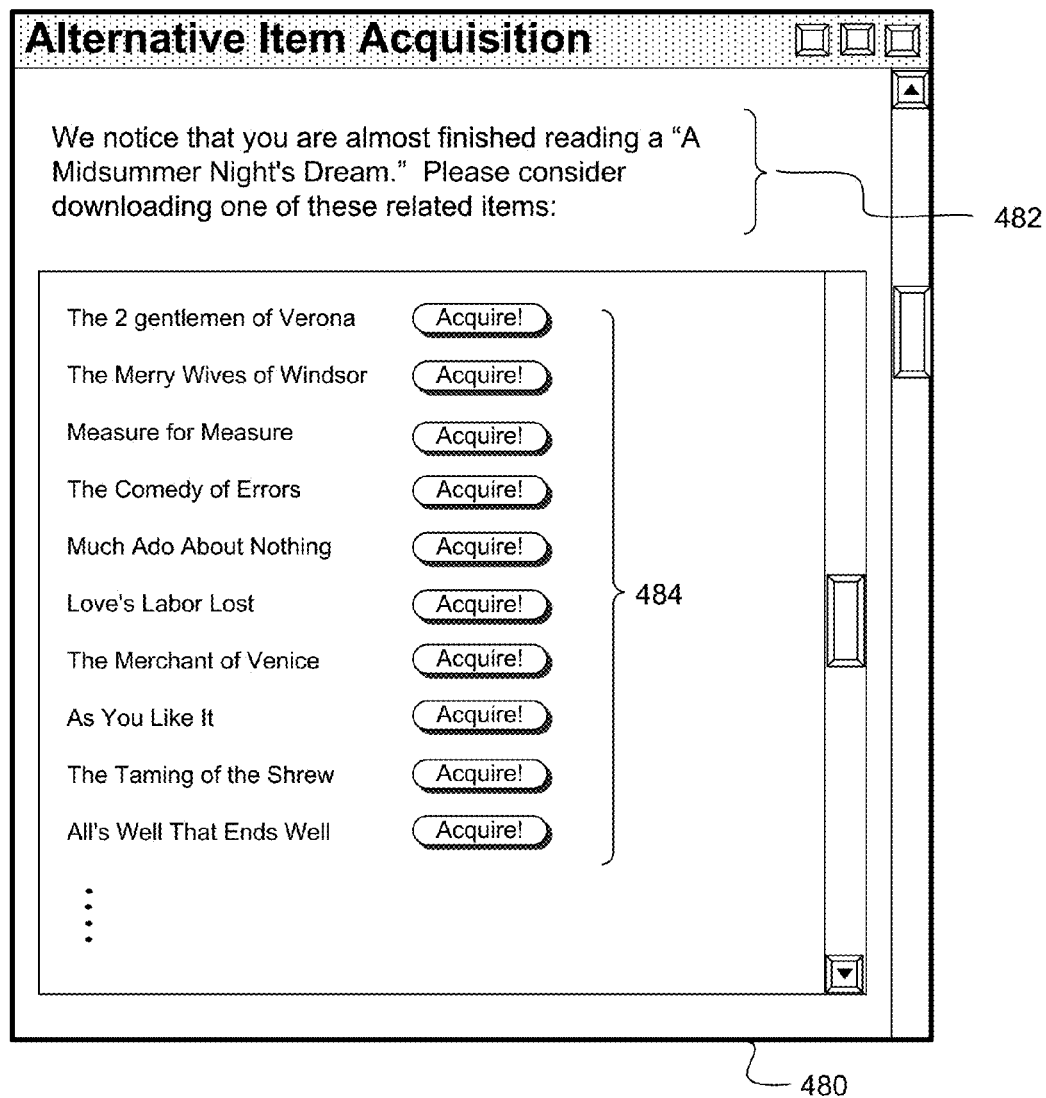
FIG. 4C shows another exemplary UI presentation for acquiring an item. In this case, the UI presentation provides a prompt near the end of one component item in response to a triggering event related to the user's consumption of the component item.

FIG. 4C shows yet another presentation page 480 that allows the user to acquire one or more additional component items in the context of the consumption of a current component item. For instance, in the illustrative case of FIG. 4, the user is currently reading a comedy by Shakespeare, entitled "A Midsummer Night's Dream." At a predetermined juncture in the user's consumption of this work, the sample selection module 128 can alert the user to the fact that the user is nearing the end of the work. Message 482 conveys this information. At this juncture, the sample selection module 128 can also provide one or more prompts 484 that allow the user to acquire one or more additional component items. Here, the sample selection module 128 presents prompts 484 corresponding to other comedies written by Shakespeare. The user can activate one or more of these prompts 484 to receive one or more other comedies by Shakespeare. Through this provision, the local store 120 of the device 102 will likely contain another eBook by the time the user finishes reading "A Midsummer Night's Dream." This approach is potentially advantageous from both the perspective of the book merchant (e.g., because it promotes sales) and the user (e.g., because the user conveniently receives relevant books at opportune times).

There are at least two considerations which govern the behavior of the above-described functionality: (1) the timing at which the sample selection module 128 invites the user to acquire additional component items; and (2) the considerations used to select the additional component items.

As to the first consideration, the system 100 can detect a triggering event which indicates that the user is nearing completion of a current component item (e.g., "A Midsummer Night's Dream"). The logic which detects the triggering event can be implemented by the operations center 104 (e.g., by the sample selection module 128), by the user's device 102, or by a combination of the operations center 104 and the user device 102. According to one exemplary implementation, the local device 102 can determine that the user is currently reading the last chapter of A Midsummer Night's Dream. In response, the local device 102 can notify the sample selection module 128 of this fact. In response, the sample selection module 128 can generate the page 480 shown in FIG. 4C. In another exemplary implementation, the sample selection module 128 can monitor the amount of time that has elapsed since downloading A Midsummer Night's Dream to the user. After a predetermined amount of time has elapsed (e.g., 30 days or any other appropriate interval), the sample selection module 128 can generate the page 480 shown in FIG. 4C. In yet another exemplary implementation, the original downloaded version of A Midsummer's Night Dream can contain metadata which enables the local generation of page 480 without contacting the operations center 104 at all. Still other implementations are possible.

However implemented, the triggering event can be based on any one or more of the following occurrences:

In one case, as summarized above, a triggering event occurs a predetermined amount of time after a current component item is downloaded to the user. This predetermined amount of time can be defined in advance. Or this predetermined amount of time can be customized based on the consumption behavior of the user, e.g., by noting that the user buys a new book once a month, and so on. In yet another case, the user may be given the opportunity to expressly define this predetermined time.

In another case, a triggering event occurs when it is detected that the user has consumed a predetermined amount of a book, or inversely, that the user has yet to consume a predetermined remaining amount of the book. For example, this triggering event can be generated when the user reaches the last chapter of a book, the last n pages of a book, the last z percent of a book, and so on. Again, this triggering event can be customized based on the empirically-determined consumption behavior of the user, or based on the user's expressly-stated preferences, or based on both factors.

In another case, a triggering event can also take into account how quickly the user is reading a particular book. For example, the system 100 can determine that the user is on chapter 12 of a 17-chapter book, but can also detect that the user is reading at a rate of one chapter every 48 hours. The rate information can be used to accelerate or delay the generation of the page 480.

Other triggering events can be used to determine when to generate the prompts. Further it should be noted that a triggering event can also correspond to the scenario shown in FIG. 4B, where the user has actually finished reading the eBook.

As to the second of the above-defined considerations, the system 100 can apply any one or more considerations set forth with respect to FIG. 4B in determining what additional component item(s) to present to the user.

In another implementation of the scenario shown in FIG. 4C, the system 100 can present multiple prompts at different points in the user's consumption of A Midsummer Nights Dream. These prompts can vary in content depending on how far the user has progressed in the book, or how close the user is to finishing the book. For example, the prompts can become progressively more detailed and/or obtrusive as the user progresses through the book.

Finally, the above discussion is framed in the exemplary context of eBook consumption. However, the same principles set forth above can be applied to the consumption of any kind of item, such as music.

Figures 5, 6A, 6B:
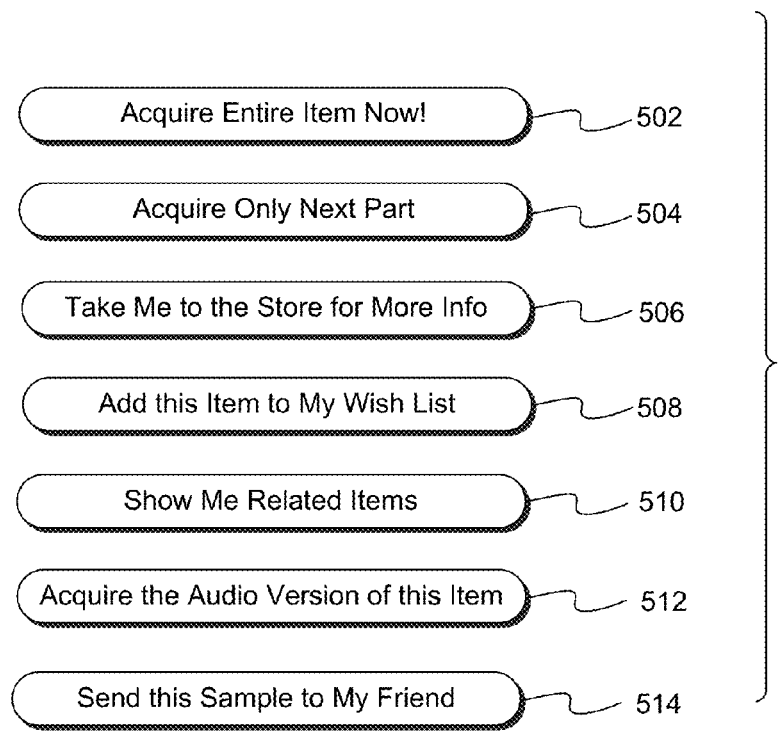
FIG. 5 shows different exemplary types of prompts that can be employed in the UI presentation of FIG. 4.
FIGS. 6A and 6B show exemplary UI presentations for forwarding a sample (or an invitation to receive a sample) to another user, such as a social contact (e.g., a friend, family member, etc.).

FIG. 5 shows other kinds of prompts that can be displayed to the user in either the context of FIG. 4A, 4B, or 4C, or in yet some other context. The sample display pages can optionally include any one of these prompts or any combination of these prompts.

A first prompt 502 invites the user to purchase the entire item. The entire item can omit the portion corresponding to the sample that has already been downloaded, or can include this portion (thereby providing an integral and complete copy of the item). (It is also possible to include separate prompts which allow the user to expressly indicate whether the user wishes to receive a "remaining portion" or a "complete item").

A second prompt 504 invites the user to purchase another piece of the item, but not the entire item.

A third prompt 506 invites the user to find out more about the sample. For instance, activation of this prompt 506 can direct the user to a store user interface, whereupon the user can review additional information about the item in a detail page, and optionally then purchase the item using the above-described rapid-acquisition technique.

A fourth prompt 508 invites the user to add an item to his or her wish list.

A fifth prompt 510 requests the system 100 to show the user other samples that are related to an identified sample or other identified item.

A sixth type of prompt 512 allows the user to acquire another category of media associated with the same item. For instance, if the user is viewing a text version of an eBook, she may be given the opportunity to purchase an audio version.

A seventh prompt 514 gives the user the option of sending one or more samples or other identified items to a friend, family member, or other social contact (or, more generally, to any other user or any other device associated with any user). This might give a friend an opportunity to also review the samples and purchase corresponding items using the rapid-acquisition technique described herein. The user can identify a friend or other social contact in any manner.

For instance, the user can identify a friend or other social contact by typing in the Email address of that contact, as shown in FIG. 6A. The Email address can correspond to the social contact's personal Email address. The social contact may be able to access this personal Email address using any device. Or the address can correspond to an address of a particular device associated with the social contact, such as an eBook reader device owned by the social contact. In another case, illustrated in FIG. 6B, the user can create, in advance, a group of social contacts. The user can later select a recipient to receive a sample by clicking on one or more of the people (or devices) identified in a displayed list of such pre-established contacts. Still other mechanisms can be used to send samples to other users or devices.

In a related application, a user can send another user a list of component items. The list of component items can govern the sequencing of component items in conjunction with the type of presentation 450 shown in FIG. 4B. Namely, the user can acquire a first item in a list of items. A prompt can appear at the end of this first item that invites the user to select a next item that is identified in the list.

Figure 7:
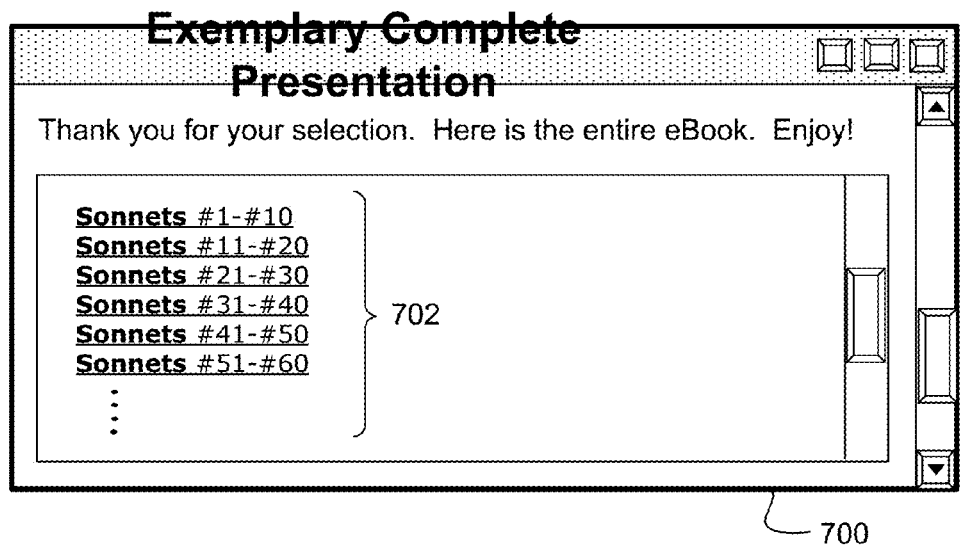
FIG. 7 shows an exemplary UI presentation that provides an additional part of the sample in response to the activation of the "Acquire the Rest" prompt in FIG. 4.

Finally, FIG. 7 shows one exemplary page 700 that can be displayed when the user activates the "Acquire the Rest" prompt 406 of FIG. 4A. That is, in response to the activation of this prompt 406, the item acquisition module 138 in conjunction with the item download module 142 can forward the entire item (or just additional parts of the item) to the user device 102 for storage in its local store 120. In this non-limiting example, the user can access, at his or her leisure, any part of the book via the page 700 which displays a table of contents 702 for the item. One skilled in the art will appreciate that other types of user interface presentations can be used to notify a user of the receipt of the additional part, and/or to allow the user to access the additional part.

A.4. Exemplary Generic Processing Functionality

FIG. 8 shows exemplary processing functionality 800 that can be used to implement various aspects of the system 100 shown in FIG. 1, such as the user device 102, the operations center 104, any component of the operations center 104, and so forth. The processing functionality 800 can represent, without limitation, any one or more of: a personal computer; a laptop computer; a server-type computer; a book-reader type device; a portable media player device; a personal digital assistant (PDA) device; a mobile telephone device; a tablet-type input device; any kind of wearable device; a game console device; a set-top box device, and so on. To facilitate discussion, the processing functionality 800 is described below as specifically implementing the representative user device 102, although, as stated, the generic processing functionality 800 also sets forth an architecture of a server-type computer that can be deployed at the operations center 104.

In the local device context, the processing unit 114 of device 102 can comprise one or more processing components 802 (such as a CPU, neural network, etc.), RAM 804, RAM 806, media components 808 (such as a hard drive, DVD drive, etc.), a network interface 810 (such as a telephone or cable modem, broadband connectivity mechanism, etc.), and an I/O interface 812 for interacting with input devices and output devices. The media components 808 can interact with a store, such as the local store 120 of FIG. 1. One or more buses 814 couple the above-described components together.

The output device(s) can include the presentation unit 116, which presents the graphical user interface 122. The input device(s) 118 can include any one or more of a keyboard, mouse input device, track ball input device, joystick input device, touch-screen input mechanism, and so forth.

In those cases in which the processing functionality 800 is used to implement the user device 102, the device's various functions can be implemented as machine-readable instructions that reside in any storage unit or combination of storage units shown in FIG. 8, and the processor 802 can execute these instructions to produce desired operations pertaining to the downloading of samples and items. In those cases in which the processing functionality 800 is used to implement the operations center 104, or some component thereof, the center's various functions can be implemented as machine-readable instructions that reside in any storage unit or combination of storage units shown in FIG. 8, and the processor 802 can execute these instructions to produce desired operations pertaining to the downloading of samples and items.

A.5. Exemplary Book-Reader Device

Among other types of user devices 102, any type of book-reading device can be used in the system 100 of FIG. 1. FIG. 9 illustrates one such exemplary book-reading device 900. As the name suggests, the book-reading device 900 (also referred to herein as an eBook reader) is specifically tailored for reading books, but it can also be used to review photos, watch video content, and so forth.

By way of overview, the illustrative eBook reader device 900 can have a body or housing 902, a dual display system comprised of a first display 904 and a second display 906, and various input mechanisms. Other types of eBook readers can be used in the system 100 of FIG. 1. These other eBook readers can vary in one or more respects from the illustrative eBook reader set forth below.

As to the housing 902, the book-reading device 900 can be configured as a handheld device having a non-symmetrical shape. The non-symmetrical shape allows the device 900 to be held in a similar manner to an actual book.

The first display 904 in the dual display system can present content in a human-readable format to the user. The content presented in the first display 904 may take the form of electronic books, newspapers, or other readable or viewable materials. For example, the display 904 provides the text of the electronic books and also depicts any illustrations, tables, or graphic elements that might be contained in the electronic books.

The second display 906 of the dual display system can be implemented as a narrow screen located adjacent to the content display 904. The narrow display screen 906 may be responsive to user input registered via, for example, a finger, a stylus, or other similar pointing device. Additionally, the narrow display screen 906 may enable presentation of graphic elements that correspond to content displayed in the content display 904. These graphic elements may be selected by the user in order to select the corresponding content in the display 904.

Among many possible input mechanisms, the book-reader device 900 may also include a user input tool 908, which can be configured to support many diverse operations. For instance, the tool 908 may enable the user to flip through pages, skip chapters, operate the narrow display 906, or scroll through content on the display 904. The tool 908 may be implemented in many forms, including as a scroll wheel, a thumb wheel, a thumb stick, a sensor that detects and registers movement of a user's thumb or finger, or any other user input mechanism.

The book-reader device 900 may be further equipped with a page turning mechanism 910 to facilitate the turning of pages of an electronic book. The page turning mechanism 910 can be specifically configured to simulate a tactile riffle feel as the user flips pages in a book. In the illustrated implementation, the page turning mechanism 910 includes a tactile member (e.g., a ridge or indentation) juxtaposed with one or more sensors, and sized to accommodate a user's thumb or finger. The tactile member provides tactile feedback to the user to simulate the riffle sensation. The sensors detect speed and direction of the user's thumb or finger, thereby enabling the device to detect gestures of flipping forward or backward through one or more pages of the book.

The book-reader device 900 may also include a plurality of programmable control surfaces 912. For convenience only, FIG. 9 shows four examples of such control surfaces 912, referenced at 912A, 912B, 912C, and 912D. The control surfaces 912 may be programmed to perform any convenient functions related to operating the device 900. The control surfaces 912A and 912B may be operable with a user's right hand, for example, while the control surfaces 912C and 912D may be operable with the user's left hand.

For example only, the control surface 912A may be programmed to present a next page (or other logical unit) of content in the content display 904 when activated. The control surface 912B may be programmed to present a menu of options in the content display 904 when activated. The control surface 912C may be configured similar to the surface 912A, so as to advance the page of content shown in the content display 904. However, the control surface 912C may be operable with the left hand. Finally, the control surface 912D may be programmed to present a previous page of content in the content display 904.

The book-reader device 900 also includes a keyboard 914, which includes a plurality of keys. In the illustrated implementation, the keyboard includes at least 26 alphabet keys arranged in a QWERTY format as well as other function keys (such as space bar, control keys, function keys, and so forth). The keys are separated into two groups including a first or left-side group of keys 914A and a second or right-side group of keys 914B. The key orientation facilitates ergonomic operation by a user's thumbs when the user is grasping the two lower corners of the device 900.

The keys, tools, and turning mechanisms are merely examples of user interface elements. The book-reading device 900 may further include other types of actuatable elements that may have dedicated or assigned operations. For instance, the device 900 may have a power on/off button, and selection keys.

In one implementation, the device 900 can display an "Acquire the Rest" type of prompt, "Acquire Another" type of prompt, or any other of the above-described types of prompts on any display surface (e.g., on the content display 904 and/or on the small display 906). The user can select such a prompt using any one or more of the input mechanisms described above. The label assigned to the prompt is exemplary only. In yet another example, the book-reader device 900 can include one or more dedicated physical keys, such as an "Acquire the Rest" or "Acquire Another" key 916, for entering an instruction to acquire the remainder of an item or to acquire another component item in a collection of component items. In the particular exemplary case of FIG. 9, the key 916 is implemented as a function-type key that belongs to the keyboard section 914. But more generally, the shape, style, placement, kind of actuation mechanism, labeling, etc. of the key 916 can be varied in any number of ways. In still another implementation, the book-reader device 900 can include a microphone and associated audio recognition circuitry for accepting a spoken instruction to "Acquire the Rest" or "Acquire Another".

Although not shown, the book-reader device 900 can also include one or more mechanisms that are specifically tailored for requesting samples, navigating among samples, selecting samples, and so forth.

As also illustrated in FIG. 9, the book-reader device 900 has various internal components, which are defined generally as book-reader subsystems 918. In one implementation, the subsystems 918 include system storage 920 and a processing unit 922. The processing unit 922 interacts with the system storage 920 to facilitate operation of the book-reader device 900. The system storage 920 may be used to store eBooks and other content 924, as well as software programs or other executable modules 926 that may be executed by the processing unit 922. Examples of such programs or modules 926 might include reader programs, control modules (e.g., power management), network connection software, operating models, display drivers, sensor algorithms, page turn detectors, and the like. The programs or modules 926 may also include logic for implementing any aspect of the above-described functionality for acquiring samples, selecting samples, and downloading additional parts of the items, etc.

Additional information regarding one type of book-reader type device can be found in the following family of applications, each of which is incorporated herein by reference in its entirety:

U.S. Ser. No. 11/246,293, filed on Mar. 29, 2006, entitled "Electronic Media Reader Display," naming the inventors of Whitehorn, et al.;

U.S. Ser. No. 11/246,294, filed on Mar. 29, 2006, entitled "Electronic Media Reader Keypad," naming the inventors of Thomas J. Hobbs, et al.;

U.S. Ser. No. 11/246,295, filed on Mar. 29, 2006, entitled "Wedge-Shaped Electronic Media Reader," naming the inventors of Whitehorn et al.;

U.S. Ser. No. 11/277,898, filed on Mar. 29, 2006, entitled "Page Turner For Handheld Electronic Book Reader Device," naming the inventors of Gregg E. Zehr, et al.;

U.S. Ser. No. 11/277,893, filed on Mar. 29, 2006, entitled "Handheld Electronic Book Reader Device Having Dual Displays," naming the inventors of Gregg E. Zehr, et al.;

U.S. Ser. No. 11/277,873, filed on Mar. 29, 2006, entitled "Handheld Electronic Book Reader Device Having Asymmetrical Shape," naming the inventors of Gregg E. Zehr, et al.;

U.S. Ser. No. 11/277,876, filed on Mar. 29, 2006, entitled "Over-the-air Device Provisioning and Activation," naming the inventors of Subram Narasimhan, et al.;

U.S. Ser. No. 11/277,879, filed on Mar. 29, 2006, entitled "Keyboard Layout for Handheld Electronic Book Reader Device," naming the inventors of Gregg E. Zehr, et al.; and U.S. Ser. No. 11/277,885, filed on Mar. 29, 2006, entitled "Content Selection and Aggregated Search Results Presentation on a Handheld Electronic Device," naming the inventors of Mitchell A. Yawitz, et al.

A.6. Functionality for Acquiring an Item Based on Preliminary Presentation of a Catalog Returning to FIG. 1, according to a second implementation, the system 100 can be used to download one or more electronic catalogs (e.g., eCatalogs) to the user. The catalogs can include one or more prompts which invite the users to acquire one or more items featured in the catalogs. The user can acquire these items by actuating these prompts.

According to one implementation of this functionality, the operations center 104 can maintain a plurality of electronic catalogs 146 in one or more of its server side stores 124. The operations center 104 can include a catalog selection module 148 that controls the downloading of the catalogs 146 to the user device 102, and a catalog download module 150 which actually performs the downloading operation.

In one exemplary case, the user can interact with the catalog selection module 148 to receive an electronic catalog by clicking on a link associated with this catalog. More specifically, to identify an applicable catalog, the user can browse through applicable catalogs using any kind of browsing tool or search tool. The catalog selection module 148 can also (or alternatively) present an invitation to download a catalog based on the online behavior of the user or other considerations. For example, if the user is viewing an item detail page pertaining to hiking boots, the catalog selection module 148 can display a prompt which invites the user to download a catalog pertaining to hiking boots in general, or perhaps hiking boots produced by a particular manufacturer. Still alternatively, the catalog selection module 148 can proactively push a catalog down to the device 102 without the user asking for such a catalog.

As to the actual download process, any of the provisions described above for downloading the sample 132 can optionally also apply to the downloading of a catalog 152. For example, the catalog download module 150 can optionally download the catalog 152 during off-peak hours.

The catalog 152 itself can comprise any kind of information pertaining to items, including image information, video information, alphanumeric (e.g., text) information, audio information, programmatic information, markup language information, Flash content information or the like, and so forth. In one case, the catalog 152 can provide information which describes the component items that are featured in the catalog. Alternatively, or in addition, the catalog 152 can provide samples of the component items featured in the catalog 152. For example, consider the case in which the catalog 152 features books that belong to a particular series. The catalog 152 can present samples corresponding to the first chapters of the books in the series. Finally, the catalog 152 can include a collection of prompts. The prompts invite the user to acquire items in the catalog 152.

Figure 10:
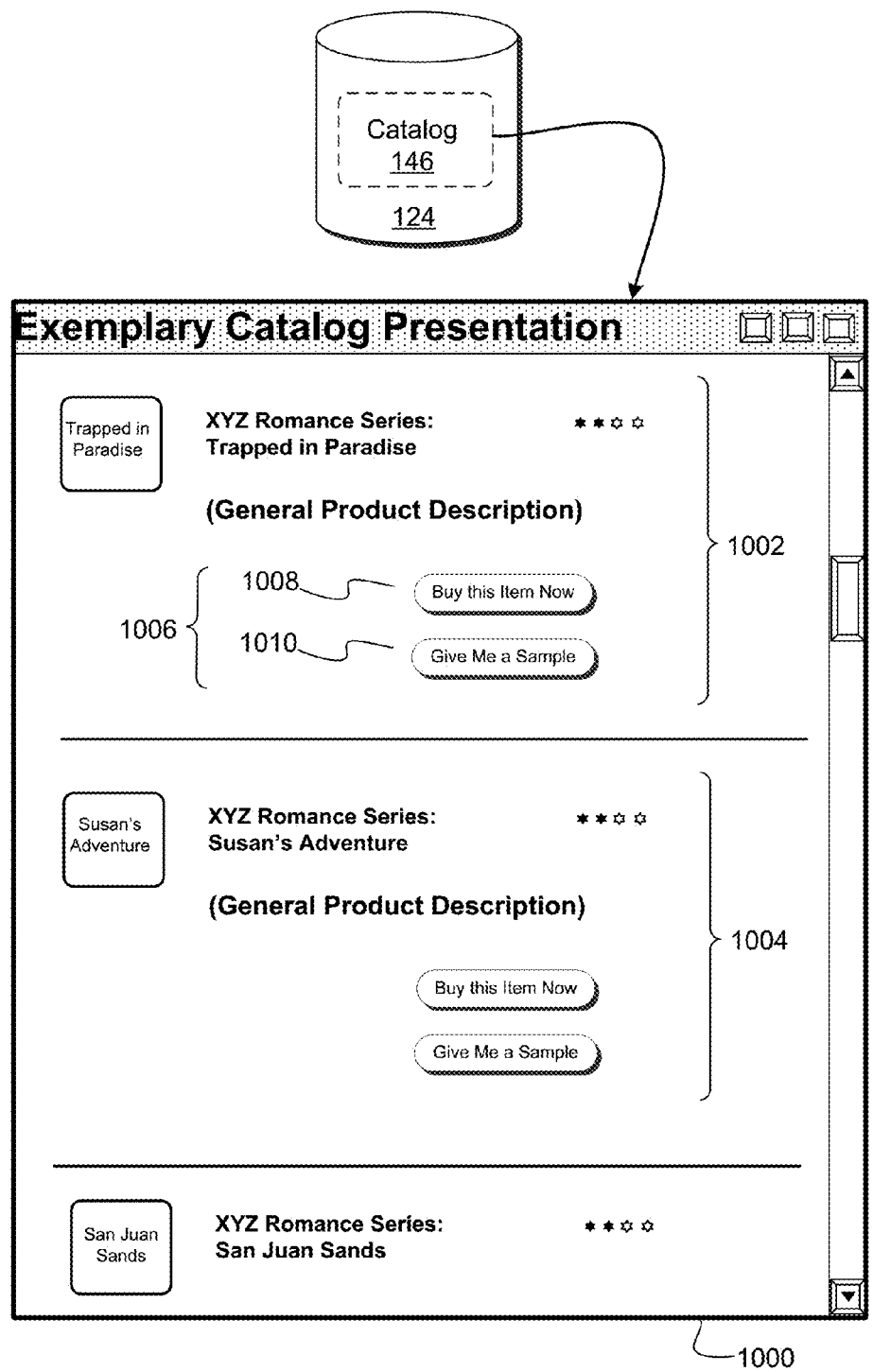
FIG. 10 shows an exemplary UI presentation for acquiring an item based on a catalog presentation.

Consider, for example, the exemplary presentation of one particular catalog shown in FIG. 10. The page 1000 shown in FIG. 10 includes a number of entries (e.g., entry 1002, 1004, etc.). Each entry may include a description of a particular product. Each entry can also provide one or more prompts that allow the user to take further action regarding the item, such as the prompts 1006 associated with the first entry 1002. A first prompt 1008 ("Buy this Item Now" or the like) allows the user to purchase the item without necessarily receiving an advance sample of the item. A second prompt 1010 ("Give Me a Sample" or the like) allows the user to receive a sample of the item. The user may activate the second prompt 1010 to receive further information regarding the item, e.g., so as to enable the user to make a decision regarding whether he or she should purchase the item. In one case, the sample can be obtained by sending a sample request to the operations center 104, upon which the operations center 104 downloads the sample in the manner described above. In another case, the catalog may include integrated sample content, so that by downloading the catalog, the user has also downloaded the samples. In this latter case, the sample can be obtained from a local store of the device 102. Although not shown, the catalog can include other kinds of prompts, such as, without limitation, any of the prompts shown in FIG. 5. Further, while FIG. 10 shows that the prompts are integrated with the entries, the prompts can alternatively be displayed in a peripheral part of a display (which is not integrated with the catalog itself), or the prompts can be implemented as physical buttons which are aligned with entries in the catalog.

A catalog can be created to group together component items based on any type of criterion or plural criteria. In connection therewith, any grouping consideration mentioned above in connection with FIG. 4B (e.g., in the context of the "Acquire Another" prompt) can be used to create a catalog of related items. But in the current context, the component items are presented to the user at the same time, rather than in succession.

Without limitation, the following list sets forth exemplary types of catalogs:

- One collection of component items in a catalog can pertain to eBooks, music or other component items that are published by a particular publisher (such as Random House) or offered by a particular merchant.
- Another collection of component items in a catalog can pertain to eBooks, music or other component items that feature a particular artist.
- Another collection of component items in a catalog can pertain to eBooks, music or other component items that are published in a particular timeframe (such as a collection of the most recent books provided by a particular merchant, etc.)
- Another collection of component items in a catalog can pertain to eBooks, music or other component items that belong to a defined series, such as books within a book series, periodicals of any nature, and so on.
- Another collection of component items in a catalog can pertain to eBooks, music or other component items that belong to an identified theme, such a philosophy, romance novels, cooking, etc.
- Another collection of component items in a catalog can pertain to eBooks, music or other component items that are identified by any kind of entity serving in a critical role or list-generating role, such as the New York Times in connection with its best seller list.
- Another collection of component items in a catalog can pertain to eBooks, music or other component items that are identified by any kind of club, such as an eBook club. The club can create lists of component items based on different types of promotional schemes.
- Another collection of component items in a catalog can pertain to eBooks, music or other component items that are identified by a particular user. A user may create such a catalog for general publication without restriction. Or the user may create such a catalog for dissemination to a predefined group of users, such as to friends. In one particular case, the user can create a catalog based on a wish list for his or her own consumption.
- Another collection of component items can pertain to eBooks, music or other component items that are grouped together based on marketing-related considerations. Any of the advertising-related provisions described above with respect to the "Acquire Another" prompt can be applied to select items for presentation in a catalog.
- Another collection of component items can pertain to eBooks, music or other component items that have a bearing on the user's previous selections or the user's characteristics or any other relevance-based considerations. For example, the catalog selection module 148 can prepare a catalog of items that is customized for the user, e.g., by selecting a group of items that are related to items that the user has purchased in the past (or otherwise expressed an interest in, e.g., by placing the items in a shopping cart, etc.).

Still other bases can be used to create groups of items. Further, the system 100 can rely on any combination of the above factors in determining what component items to include in a catalog.

In one implementation, a catalog may contain a static (e.g., fixed) collection of component items. In another implementation, a catalog may contain a dynamic collection of component items. For example, the catalog selection module 148 and catalog downloading module 150 can download a complete copy of a catalog, and thereafter send updates which have the effect of modifying the contents of the catalog. Such updates can add items to the previously-downloaded catalog, delete items, modify existing items, and so forth.

In one case, the catalog items can contain prompts that allow the user to acquire the component items described in the catalog in expedited fashion. For example, the item acquisition module 138 (of FIG. 1) can allow the user to acquire a component item without entering any other information or instructions beyond actuating a "Buy this Item Now" type of prompt. This expedited handling is enabled in the same manner described above, that is, by asking the user to create an acquisition account in advance of making a purchase. In another case, the item acquisition module 138 can provide expedited acquisition, but still require the user to engage in some minimal interaction with the operations center 104, such as by asking the user to confirm various selections, and so on.

In another case, a catalog can include one or more prompts that allow the user to find out more information about an item before purchasing an item. Further, the user may be given the option of entering set-up information at the time of purchase, and thereby forgoing the expedited acquisition operation.

Finally, the catalogs referred to above allow the user to download electronic items that are featured in the catalogs. In addition, catalogs can be created that contain prompts that allow users to purchase various "hard good" items, such as clothing articles, electronic goods, and so on. In this case, the user can purchase these items in expedited fashion, although, obviously, the goods need to be physically shipped to the user, rather than downloaded to the user.

B. Exemplary Procedures

FIGS. 11-15 describe the operation of the electronic service 100 of FIG. 1 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, hardware, a combination of software and hardware, or by other technology, or by manual processing.

As the functions described in the flowcharts have already been set forth in Section A, Section B serves principally as a review of those functions.

Figure 11:
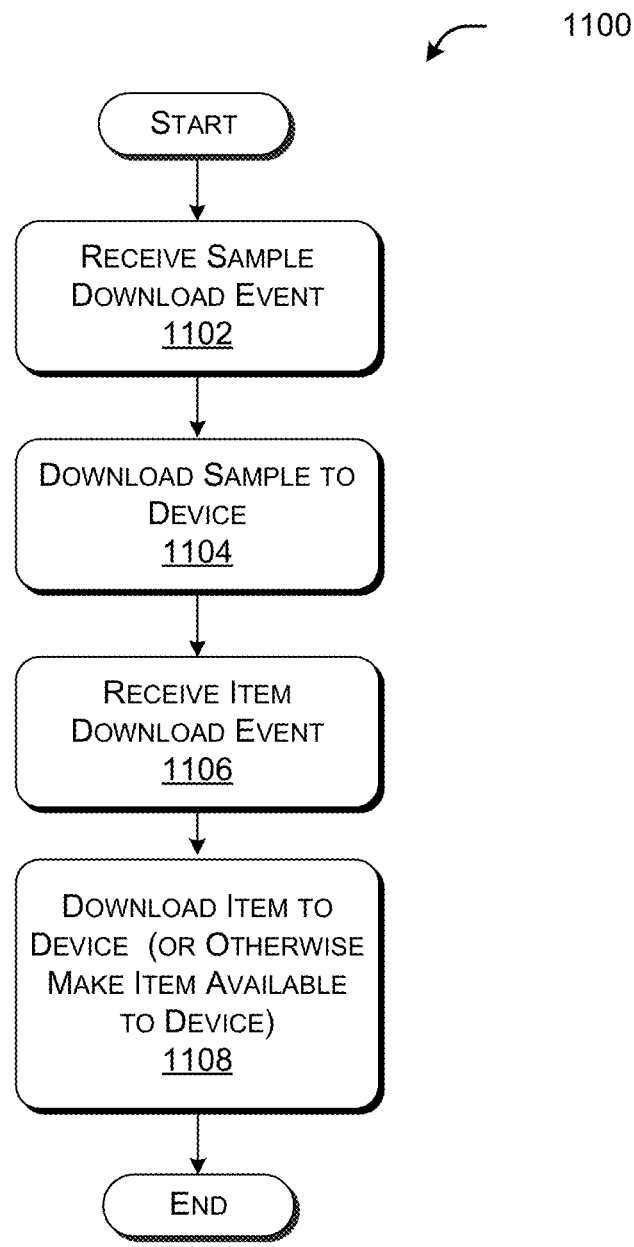
FIG. 11 shows an exemplary server-side procedure for downloading a sample of an item, followed by downloading an additional part of the item.

B.1. Item Downloading Procedure in Response to Preliminary Presentation of a Sample: Operations Center-Side Perspective FIG. 11 shows a procedure 1100 for downloading an item to the device 102 from the perspective of the operations center 104.

In block 1102, the operations center 114 receives a sample download event. This event may reflect any of the triggering circumstances described above, e.g., in the context of FIG. 3A or 3B. The sample download event can correspond to a push-type event, where the operations center 104 decides to download a sample or an at least an invitation to receive a sample without being expressly prompted to do so by the user. Or the sample download event can correspond to an express request by the user to receive a sample.

In block 1104, the operations center 104 downloads one or more samples to the user device 102.

In block 1106, the operations center 104 receives the user's activation of an "Acquire the Rest" or "Acquire Another" type of prompt, or similar type of prompt.

In block 1108, the operations center 104 downloads an additional part of the item, constituting the entire item (exclusive or inclusive of the already-downloaded sample) or just another piece of the entire item or another component item in an encompassing collection of component items. Alternatively, the device 102 may already store the entire content, but is prevented from accessing and consuming it because of access restrictions. In this case, block 1106 may correspond to simply removing these restrictions and allowing the user to access the content.

Figure 12:
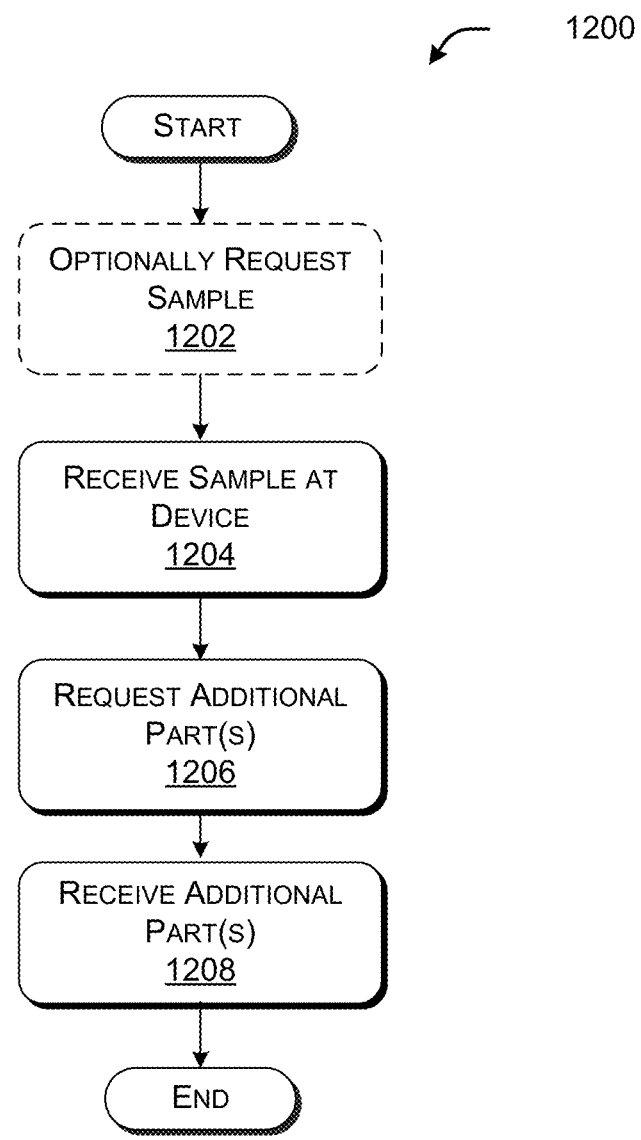
FIG. 12 shows an exemplary user-side procedure for receiving a sample of an item, followed by receiving an additional part of the item.

B.2. Item Downloading Procedure in Response to Preliminary Presentation of a Sample: User Device-Side Perspective FIG. 12 shows a download procedure 1200 from the perspective of the local device 102, which is the counterpart of the server-side procedure 1000 shown in FIG. 10.

In block 1202, the user optionally requests a sample using any technique described above. This operation is optional because the operations center 104 may have used push technology to automatically provide a sample to the user without being requesting to do so by the user.

In block 1204, the device 102 receives the sample.

In block 1006, the user reviews the samples, decides whether he or she wishes to acquire an additional part of the item, and if so, activates an "Acquire the Rest" or "Acquire Another" type of prompt.

In block 1008, in response to the activation of the Acquire the Rest or Acquire Another prompt, the user receives an additional part of the item, or the device 102 can simply remove access restrictions on content that the device 102 already possesses.

B.3. "Acquire Another" Procedure

Figure 13:
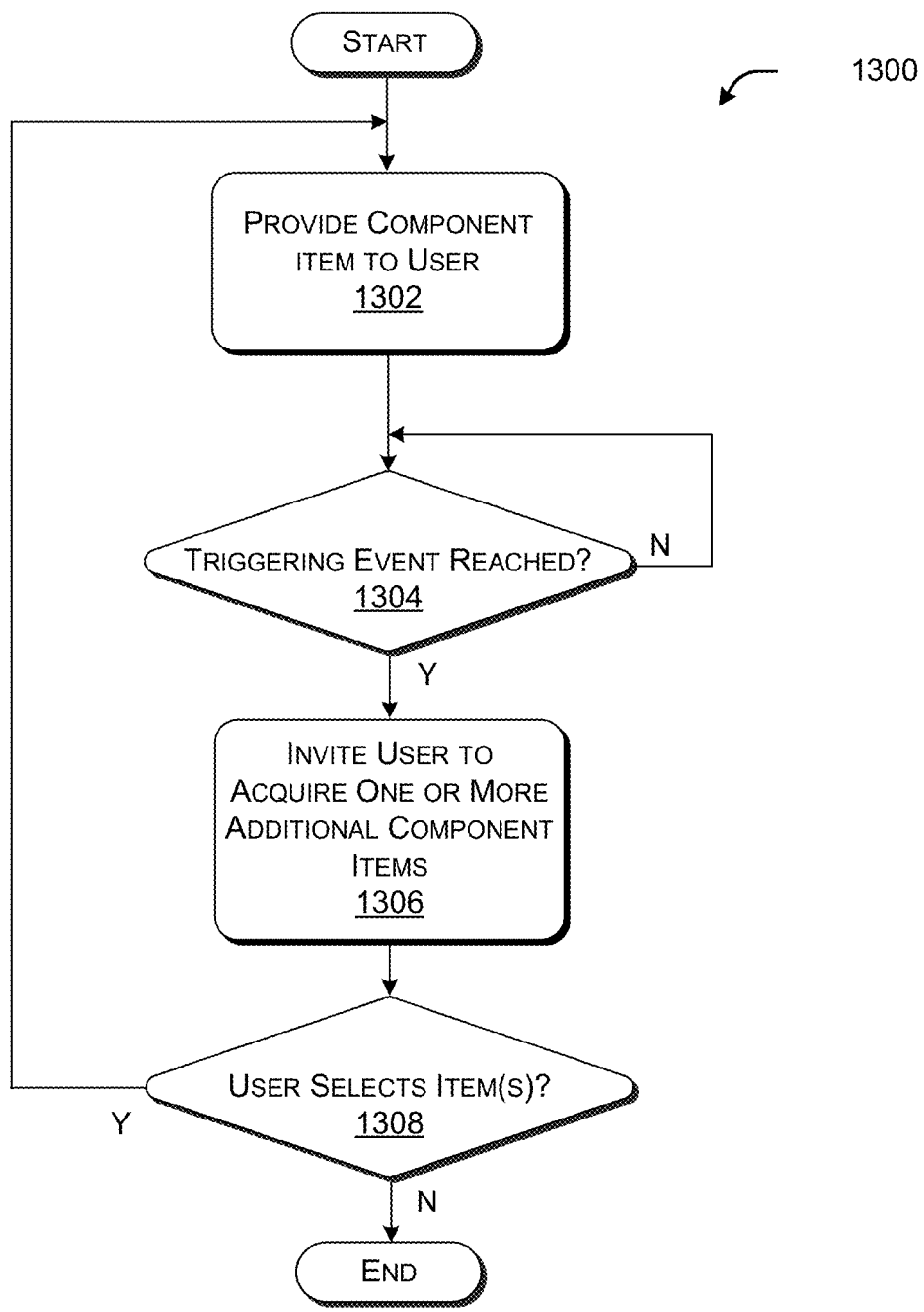
FIG. 13 shows an exemplary procedure for providing an additional component item in response to a triggering event.

FIG. 13 shows a procedure 1300 that provides additional details regarding the operation of the "Acquire Another" functionality introduced above in the context of FIGS. 4B and 4C.

In block 1302, the user acquires an initial component item through any type of item-acquisition protocol.

In block 1304, the system 100 determines whether a predetermined triggering event has occurred that relates to the user's consumption of the initial component item. Exemplary types of triggering events were enumerated in Section A. One triggering event occurs when the user actually reaches the end of the initial component item. Another triggering event occurs when a predetermined amount of time has elapsed following the downloading of the initial component item. Another triggering event occurs when the user consumes a predetermined amount of the initial component item (or has yet to consume a predetermined amount of this item). Further, the user's rate of consumption can be taken into account when generating the triggering event.

In block 1306, assuming that a triggering event has occurred, the system 100 generates a list of one or more additional component items and associated prompts. The prompts invite the user to purchase the associated additional component items. The system 100 can use any one or more of the above-described considerations in deciding what additional component items to recommend to the user (e.g., see the discussion of FIG. 4B). For instance, the list can include: component items that belong to a same series (e.g., book series or periodical series); component items selected from the user's wish list; component items that share the same author, theme, publisher, or other characteristic(s); component items that are selected based on the user's prior purchases and/or other selections; component items that are selected based on the user's characteristics (e.g., demographics), and so on.

In block 1308, assuming that the user activates one of the prompts, the procedure 1300 loops around to block 1302, where a component item associated with the activated prompt is downloaded to the device 102. The procedure then repeats, where the newly downloaded component item now serves the role of the initial component item.

Figure 14:
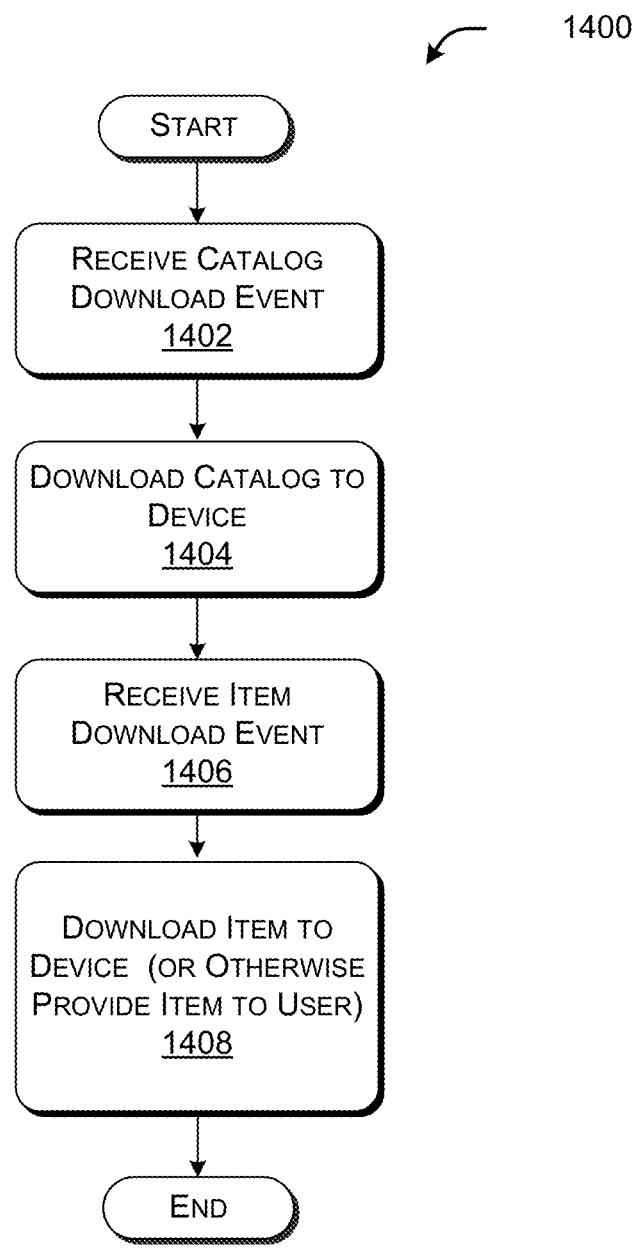
FIG. 14 shows an exemplary server-side procedure for downloading a catalog, followed by downloading or otherwise acquiring an item that is featured in the catalog.

B.4. Item Downloading Procedure in Response to Preliminary Downloading of a Catalog: Operations Center-Side Perspective FIG. 14 shows a procedure 1400 for downloading an item to the device 102, from the perspective of the operations center 104.

In block 1402, the operations center 104 receives a catalog download event. This event may reflect the user expressly requesting a catalog, or some other type of event.

In block 1404, the operations center 104 downloads one or more catalogs to the user device 102.

In block 1406, the operations center 104 receives the user's activation of one or more prompts provided by the downloaded catalog. The user may be specifically requesting to acquire an item that is described in the catalog. Or the user may be requesting to acquire just a sample of a featured item. The user can take yet additional kinds of actions in response to reviewing a catalog.

In block 1408, the operations center 104 downloads the selected item to the device 102 or otherwise makes the content available to the device 102. Alternatively, this block 1408 may involve actually shipping a selected item to the user.

Figure 15:
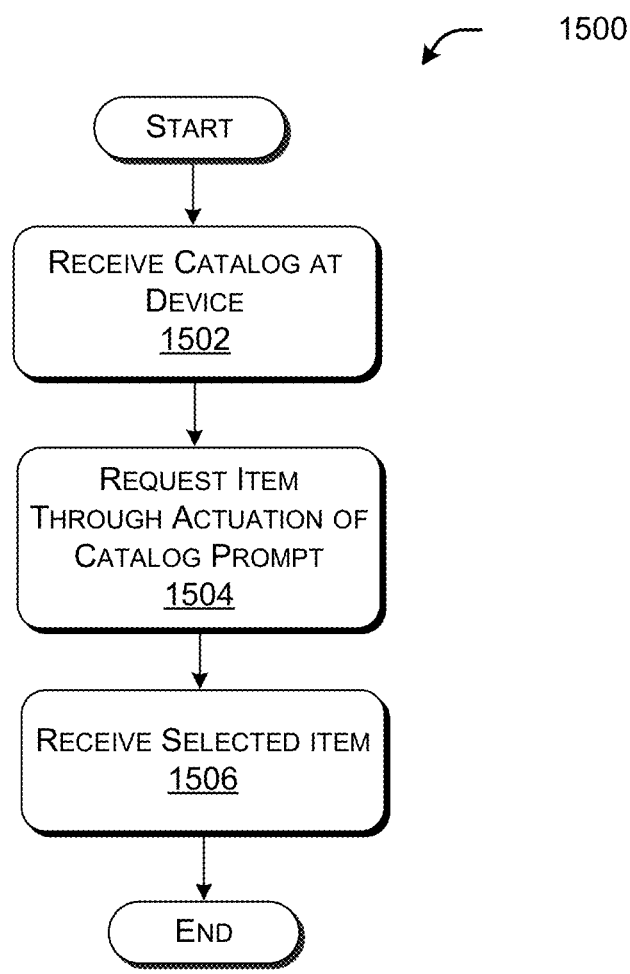
FIG. 15 shows an exemplary user-side procedure for receiving a catalog and then acquiring an item featured in the catalog.

B.5. Item Downloading Procedure in Response to Preliminary Presentation of a Catalog: User Device-Side Perspective FIG. 15 shows a download procedure 1500 from the perspective of the local device 102, which is the counterpart of the server-side procedure 1300 shown in FIG. 13.

In block 1502, the user receives one or more electronic catalogs.

In block 1504, the user, in the course of browsing through a particular downloaded catalog, requests one or more items identified in the catalog. The user can request these items by actuating prompts in the catalog that are associated with the items.

In block 1506, in response to the activation of the prompt (s), the user receives the selected item(s), either by receiving downloaded electronic content, or by receiving shipped physical goods.

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    receiving, from a content provider, a sample of content on a media device,
        the sample of the content comprising at least
            (i) a descriptor identifying the content and
            (ii) a portion of a body of the content, the body including at least some text,
        wherein the sample of the content is received without transmitting a request for the sample of the content;
    causing display of a prompt on the media device in association with the sample of the content,
        wherein receipt of a user input corresponding to the prompt initiates access to an additional part of the content;
    in response to the receipt of the user input corresponding to the prompt, transmitting, to the content provider by the media device, a message to access the additional part of the content; and
    receiving, by the media device, access to the additional part of the content in response to at least the transmitting the message to access the additional part of the content.

2. The method as recited in claim 1,
    wherein receiving the sample of the content comprises receiving an item that is part of a subscription to content, and
    wherein receiving access to the additional part of the content comprises receiving access to remaining items in the subscription to the content.

3. The method as recited in claim 1, further comprising
    transmitting, to the content provider by the media device, an additional message to authorize a payment for the additional part of the content; and
    wherein receiving access to the additional part of the content is based at least in part on transmitting the additional message to authorize the payment.

4. The method as recited in claim 3, wherein the transmitting the message to authorize the payment includes at least one of:
    transmitting an account identifier (ID) identifying a user account that authorizes the payment of the additional part of the content; or
    transmitting payment information for the payment of the additional part of the content.

5. The method as recited in claim 1, wherein the message to access the additional part of the content includes payment information to purchase the additional part of the content.

6. The method as recited in claim 1, further comprising presenting at least one additional descriptor that includes (i) text, imagery, audio, or video from the body of the content, or (ii) text, imagery, audio, or video describing the body of the content.

7. The method as recited in claim 1, wherein the prompt is an audible prompt; and further comprising:
    prior to transmitting the user input corresponding to the prompt, audibly receiving, via the media device, the user input corresponding to the prompt by a microphone on the media device; and
    interpreting the user input corresponding to the prompt using voice recognition.

8. One or more non-transitory computer-readable media that store computer instructions that, when executed, causes one or more processors to:
    receive, from a content provider, a sample of content that comprises at least
        a title,
        a name of an artist or an author of the content, and
        one additional textual descriptor of the content,
            wherein the sample of the content is received without transmitting a request for the sample of the content;
    receive, from the content provider, a prompt, wherein a user input that corresponds to the prompt transmits a request to the content provider for access to an additional part of the content; and
    receive, from the content provider, access to the additional part of the content based at least in part on transmitting the request to the content provider for access to the additional part of the content.

9. The one or more non-transitory computer-readable media as recited in claim 8, wherein the computer instructions, when executed, further cause the one or more processors to, in response to the user input that corresponds to the prompt,
    transmit to the content provider an additional message to authorize payment for the additional part of the content; and
    receive access to the additional part of the content based at least in part on transmitting the message to authorize the payment.

10. The one or more non-transitory computer-readable media as recited in claim 8,
    wherein the computer instructions, when executed, further cause the one or more processors to transmit user account information associated with a media device, and
    wherein the user account information includes payment information that authorizes a purchase of the additional part of the content.

11. The one or more non-transitory computer-readable media as recited in claim 8, wherein the content comprises an electronic book in a collection of related electronic books.

12. The one or more non-transitory computer-readable media as recited in claim 8, wherein the sample of the content comprises an item of a subscription to content, and the additional part of the content comprises remaining items in the subscription to content.

13. The one or more non-transitory computer-readable media as recited in claim 8, wherein the sample of the content is associated with a collection of related electronic books that pertain to at least one of a series of books, a particular author or a particular publisher.

14. The one or more non-transitory computer-readable media of claim 8, wherein the one additional textual descriptor of the content comprises user comments associated with the content.

15. The one or more non-transitory computer-readable media of claim 8, wherein the sample of the content is based at least in part on prior user selections of associated content.

16. The one or more non-transitory computer-readable media as recited in claim 8, wherein the one additional textual descriptor comprises one of (i) text from a body of the content, or (ii) text describing the body of the content.

17. A system comprising:
   memory;
   one or more processors; and
   a plurality of modules stored in the memory and executable by the one or more processors, the plurality of modules comprising:
     a sample selection module to send to a media device, a sample of an electronic book (eBook) and a prompt to initiate access to an additional part of the eBook, the sample of the eBook comprising at least
       (i) a descriptor that identifies the eBook and
       (ii) a portion of a body of the eBook,
     wherein the sample of the eBook is received without transmitting a request for the sample of the eBook;
     a content acquisition module to receive, in response to at least receipt of a user input that corresponds to the prompt from the media device, a message requesting access to the additional part of the eBook; and
     a content download module to initiate access to the additional part of the eBook, in response to at least the content acquisition module receiving the message to access the additional part of the eBook.

18. The system as recited in claim 17, further comprising a registration module to establish a user account that authorizes acquiring the additional part of the eBook, the user account comprising user identification information, payment information, and one or more media devices associated with the user account.

19. The system as recited in claim 17, wherein the content acquisition module is further executable by the one or more processors to:
   receive payment information authorizing a purchase of the additional part of the eBook from at least one of a registration module, the message requesting access to the additional part of the eBook, or an additional message that includes the payment information authorizing the purchase of the additional part of the eBook; and
   wherein the content download module is further executable by the one or more processors to initiate access to the additional part of the eBook in response to the receipt of the payment information authorizing the purchase of the additional part of the eBook.

20. The system as recited in claim 17,
   wherein the sample selection module further operates to send an additional prompt to the media device, and
   wherein the content acquisition module further operates to process receipt of a user input corresponding to the additional prompt to determine a selection of an alternate media device to receive the additional part of the eBook.

\* \* \* \* \*